United States Patent
Elias et al.

(10) Patent No.: US 9,836,460 B2
(45) Date of Patent: Dec. 5, 2017

(54) SYSTEMS AND METHODS FOR ANALYZING PATENT-RELATED DOCUMENTS

(75) Inventors: Brian K. Elias, Springboro, OH (US); Matthew C. Morrise, Portland, OR (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 0 days.

(21) Appl. No.: 12/813,976

(22) Filed: Jun. 11, 2010

(65) Prior Publication Data

US 2011/0307499 A1    Dec. 15, 2011

(51) Int. Cl.
G06F 17/30    (2006.01)

(52) U.S. Cl.
CPC .. G06F 17/30011 (2013.01); G06F 17/30713 (2013.01); G06F 17/30716 (2013.01)

(58) Field of Classification Search
CPC ............. G06F 17/2247; G06F 17/2735; G06F 17/2705; G06F 17/30864
USPC ........ 707/707, 765; 715/273, 737, 227, 255, 715/256; 705/273, 737, 227
See application file for complete search history.

(56) References Cited

U.S. PATENT DOCUMENTS

| | | | |
|---|---|---|---|
| 5,144,679 A * | 9/1992 | Kakumoto et al. ........... 382/113 |
| 5,159,552 A | 10/1992 | Van Gasteren et al. |
| 5,588,149 A * | 12/1996 | Hirose |
| 5,623,679 A | 4/1997 | Rivette et al. |
| 5,623,681 A | 4/1997 | Rivette et al. |
| 5,754,840 A * | 5/1998 | Rivette et al. |

(Continued)

FOREIGN PATENT DOCUMENTS

| | | |
|---|---|---|
| EP | 2156271 | 9/2011 |
| JP | 2003-308318 | 10/2003 |

(Continued)

OTHER PUBLICATIONS

Computer Sciences Corporation, User's Manual for the Examiner's Automated Search Tool (EAST) 2.1, pp. 1-256; especiallly, p. 6-89, Figure 6-78; p. 6-90, Figure 6.79; p. 6-91, Figure 6-80; p. 7.1, Figure 7.1; p. 7.14, Figure 7.14; p. 7.25, Figure 7.25; p. 7.27, Figure 7.27, May 5, 2006.*

(Continued)

*Primary Examiner* — Frantz Coby
(74) *Attorney, Agent, or Firm* — Dinsmore & Shohl LLP

(57) ABSTRACT

Methods and systems are disclosed that analyze patent-related documents having at least one property type. In one implementation, a method involves displaying, in a first graphical element, identifiers of the patent-related documents. The method also involves analyzing the patent-related documents to determine at least one property value for the property type. The property value includes a string of one or more words describing subject matter associated with the patent-related documents and occurring in a subset of the patent-related documents. The method also displays a second graphical element associated with the property type. The second graphical element includes the property value. The method receives, at the second graphical element, a user selection of the property value. The method displays, in the first graphical element, identifiers of the subset of the patent-related documents in which the property value occurs.

12 Claims, 15 Drawing Sheets

(56) References Cited

U.S. PATENT DOCUMENTS

| | | | |
|---|---|---|---|
| 5,774,833 A * | 6/1998 | Newman | G06F 17/211 704/9 |
| 5,799,325 A | 8/1998 | Rivette et al. | |
| 5,806,079 A | 9/1998 | Rivette et al. | |
| 5,809,318 A | 9/1998 | Rivette et al. | |
| 5,845,301 A | 12/1998 | Rivette et al. | |
| 5,991,751 A * | 11/1999 | Rivette | G06F 17/30716 |
| 6,002,798 A * | 12/1999 | Palmer et al. | 382/176 |
| 6,014,663 A * | 1/2000 | Rivette et al. | 707/690 |
| 6,038,561 A * | 3/2000 | Snyder et al. | |
| 6,457,004 B1 * | 9/2002 | Nishioka et al. | |
| 6,574,645 B2 | 6/2003 | Petruzzi et al. | |
| 6,793,429 B2 * | 9/2004 | Arrison | 401/93 |
| 6,823,331 B1 * | 11/2004 | Abu-Hakima | 707/758 |
| 6,871,174 B1 * | 3/2005 | Dolan | G06F 17/30684 704/9 |
| 7,162,465 B2 * | 1/2007 | Jenssen | G06F 17/2735 |
| 7,194,406 B2 * | 3/2007 | Ejerhed | G06F 17/27 704/3 |
| 7,194,693 B2 * | 3/2007 | Cragun et al. | 715/747 |
| 7,254,773 B2 * | 8/2007 | Bates | G06F 17/2247 715/256 |
| 7,296,015 B2 * | 11/2007 | Poltorak | 707/707 |
| 7,398,210 B2 * | 7/2008 | Valdes | G06F 17/273 704/255 |
| 7,412,441 B2 | 8/2008 | Scott et al. | |
| 7,444,589 B2 | 10/2008 | Zellner | |
| 7,516,492 B1 | 4/2009 | Nisbet et al. | |
| 7,533,096 B2 | 5/2009 | Rice et al. | |
| 7,716,581 B2 * | 5/2010 | Tran | 715/273 |
| 7,801,909 B2 * | 9/2010 | Poltorak | 707/765 |
| 7,853,572 B2 * | 12/2010 | Lundberg et al. | 707/687 |
| 7,881,937 B2 * | 2/2011 | Hasan | G06Q 10/10 704/270 |
| 7,890,851 B1 * | 2/2011 | Milton, Jr. | 715/224 |
| 7,904,453 B2 * | 3/2011 | Poltorak | G06F 17/2705 705/310 |
| 7,941,468 B2 * | 5/2011 | Zellner et al. | 707/932 |
| 7,949,728 B2 * | 5/2011 | Rivette | G06F 17/30011 709/203 |
| 8,037,075 B2 | 10/2011 | Millett | |
| 8,065,307 B2 * | 11/2011 | Haslam | G06F 17/30011 707/738 |
| 8,160,306 B1 * | 4/2012 | Neustel | 382/113 |
| 8,739,032 B2 * | 5/2014 | Walsh | 715/273 |
| 2001/0049707 A1 | 12/2001 | Tran | |
| 2002/0120647 A1 | 8/2002 | Amano | |
| 2003/0033295 A1 * | 2/2003 | Adler | G06F 17/30637 |
| 2003/0115115 A1 | 6/2003 | Ouchi | |
| 2003/0212527 A1 | 11/2003 | Moore et al. | |
| 2003/0220897 A1 * | 11/2003 | Lee et al. | 707/1 |
| 2003/0229470 A1 * | 12/2003 | Pejic | 702/179 |
| 2004/0059994 A1 | 3/2004 | Fogel et al. | |
| 2004/0068453 A1 * | 4/2004 | Duan et al. | 705/35 |
| 2004/0068529 A1 | 4/2004 | Pai | |
| 2004/0078192 A1 * | 4/2004 | Poltorak | 704/9 |
| 2004/0078361 A1 * | 4/2004 | Hu | G06F 17/30011 |
| 2004/0078365 A1 * | 4/2004 | Poltorak | 707/3 |
| 2004/0083422 A1 * | 4/2004 | Duan | G06Q 10/10 715/200 |
| 2004/0083432 A1 | 4/2004 | Kawamura et al. | |
| 2004/0098380 A1 * | 5/2004 | Dentel et al. | 707/3 |
| 2004/0098673 A1 | 5/2004 | Riddoch et al. | |
| 2004/0113916 A1 * | 6/2004 | Ungar et al. | 345/589 |
| 2004/0123235 A1 | 6/2004 | Yeh et al. | |
| 2004/0176115 A1 | 9/2004 | Atkin et al. | |
| 2004/0194032 A1 * | 9/2004 | Liu | G06F 17/2247 715/255 |
| 2005/0005239 A1 | 1/2005 | Richards | |
| 2005/0010863 A1 | 1/2005 | Zernik | |
| 2005/0065920 A1 * | 3/2005 | He et al. | 707/3 |
| 2005/0097464 A1 | 5/2005 | Graeber | |
| 2005/0108652 A1 | 5/2005 | Beretich et al. | |
| 2005/0125744 A1 | 6/2005 | Hubbard et al. | |
| 2005/0144206 A1 | 6/2005 | Baumann | |
| 2005/0210009 A1 * | 9/2005 | Tran | 707/3 |
| 2005/0210042 A1 * | 9/2005 | Goedken | 707/100 |
| 2005/0234685 A1 | 10/2005 | Tanigawa | |
| 2005/0261891 A1 | 11/2005 | Chan et al. | |
| 2006/0004730 A1 * | 1/2006 | Chan | G06F 17/30864 |
| 2006/0047676 A1 | 3/2006 | Ouchi | |
| 2006/0156222 A1 * | 7/2006 | Chi et al. | 715/512 |
| 2006/0190807 A1 | 8/2006 | Tran | |
| 2006/0271522 A1 | 11/2006 | Scott et al. | |
| 2007/0011154 A1 * | 1/2007 | Musgrove et al. | 707/5 |
| 2007/0055485 A1 | 3/2007 | Kierzenka et al. | |
| 2007/0078886 A1 | 4/2007 | Rivette et al. | |
| 2007/0198578 A1 | 8/2007 | Lundberg et al. | |
| 2007/0208764 A1 | 9/2007 | Grisinger | |
| 2007/0239760 A1 | 10/2007 | Zhang et al. | |
| 2007/0276796 A1 * | 11/2007 | Sampson | G06F 17/30705 |
| 2007/0288448 A1 * | 12/2007 | Datta | 707/5 |
| 2007/0288449 A1 * | 12/2007 | Datta et al. | 707/5 |
| 2007/0294232 A1 * | 12/2007 | Gibbs | G06F 17/30637 |
| 2008/0016445 A1 * | 1/2008 | Dykes et al. | |
| 2008/0033736 A1 | 2/2008 | Bulman | |
| 2008/0086450 A1 * | 4/2008 | Bittenson | 707/3 |
| 2008/0114668 A1 | 5/2008 | Peters et al. | |
| 2008/0124050 A1 | 5/2008 | Deschamp et al. | |
| 2008/0183518 A1 * | 7/2008 | Jiang et al. | 705/7 |
| 2008/0243979 A1 | 10/2008 | Cherkauer et al. | |
| 2008/0247532 A1 | 10/2008 | Schulz | |
| 2008/0281860 A1 | 11/2008 | Elias et al. | |
| 2009/0019355 A1 * | 1/2009 | Jiang | G06Q 10/10 715/227 |
| 2009/0070301 A1 | 3/2009 | McLean et al. | |
| 2009/0077124 A1 | 3/2009 | Spivack et al. | |
| 2009/0138466 A1 | 5/2009 | Henry et al. | |
| 2009/0157679 A1 | 6/2009 | Elias et al. | |
| 2009/0177656 A1 * | 7/2009 | Carter | 707/6 |
| 2009/0210828 A1 | 8/2009 | Kahn | |
| 2009/0228777 A1 | 9/2009 | Henry et al. | |
| 2009/0276694 A1 * | 11/2009 | Henry et al. | 715/243 |
| 2010/0131513 A1 * | 5/2010 | Lundberg et al. | 707/741 |
| 2010/0153405 A1 * | 6/2010 | Johnson et al. | 707/749 |
| 2010/0191748 A1 | 7/2010 | Martin et al. | |
| 2010/0287478 A1 * | 11/2010 | Avasarala et al. | 715/737 |
| 2011/0072342 A1 * | 3/2011 | Tran | 715/273 |
| 2011/0093449 A1 * | 4/2011 | Belenzon et al. | 707/708 |
| 2011/0191310 A1 * | 8/2011 | Liao et al. | 707/706 |
| 2011/0307499 A1 | 12/2011 | Elias et al. | |
| 2012/0078979 A1 * | 3/2012 | Ghimire | G06F 17/30648 707/805 |
| 2013/0124515 A1 * | 5/2013 | Ghimire | G06F 17/30643 707/728 |

FOREIGN PATENT DOCUMENTS

| | | |
|---|---|---|
| JP | 2003-323322 | 11/2003 |
| JP | 2006-065882 | 3/2006 |
| JP | 2010-527067 | 8/2010 |
| WO | WO 2008/140721 | 11/2008 |
| WO | WO 2009/079357 | 6/2009 |
| WO | WO 2011/156134 | 12/2011 |

OTHER PUBLICATIONS

Notification of Transmittal of the International Search Report and the Written Opinion of the International Searching Authority in International Application No. PCT/US 11/37863 dated Aug. 30, 2011 (14 pages).

Notification of Transmittal of the International Search Report and the Written Opinion of the International Searching Authority in International Application No. PCT/US2008/086540 dated Mar. 9, 2009 (13 pages).

Notification of Transmittal of the International Search Report and the Written Opinion of the International Searching Authority in International Application No. PCT/US/08/05859 dated Oct. 23, 2008 (13 pages).

(56) References Cited

OTHER PUBLICATIONS

Brian K. Elias et al., U.S. Appl. No. 12/314,592, filed Dec. 12, 2008, entitled "Method and Computer Program Product for Analyzing Documents."
Brian K. Elias et al., U.S. Appl. No. 12/149,784, filed May 8, 2008, entitled "Systems and Methods for Analyzing Documents."
Canadian Intellectual Property Office, Office Action dated Mar. 14, 2017 in Canadian Patent Application No. 2,802,155.
Notice of Rejection, dated Feb. 22, 2213, for Japanese Application No. 2010-507444 (13 pages).
Novak, "Conversion of Units of Measurement," IEEE Transaction on Software Engineering, vol. 21, No. 8, Aug. 1995, pp. 651-661.
Communication, in European Application No. 08 754 231.2-1238, dated Aug. 23, 2011 (1 page).
Supplementary European Search Report, in European Application No. 08 754 231.2-1238, dated Jul. 28, 2011 (5 pages).
International Preliminary Report on Patentability for International Application No. PCT/US2008/005859, dated Nov. 19, 2009 (2 pages).
International Preliminary Report on Patentability for International Application No. PCT/US2008/086540, dated Jun. 24, 2010 (7 pages).
International Preliminary Report on Patentability for International Application No. PCT/US2008/086540, dated Mar. 9, 2009 (13 pages).
International Preliminary Report on Patentability for International Application No. PCT/US2011/37863, dated Aug. 30, 2011 (9 pages).
Office Action, dated Aug. 8, 2011, in U.S. Appl. No. 12/314,592, filed Dec. 12, 2008.
Office Action, dated Dec. 13, 2011, in U.S. Appl. No. 12/314,592, filed Dec. 12, 2008.
Office Action, dated Mar. 3, 2011, in U.S. Appl. No. 12/314,592, filed Dec. 12, 2008.
Kazuya Konishi et al., "A Support Function of Understanding Patent Claims for Efficient Patent Investigation," Jun. 2006 (10 pages).
Office Action, dated May 23, 2012, in U.S. Appl. No. 12/149,784, filed May 8, 2008.
Office Action, dated Dec. 13, 2011, in U.S. Appl. No. 12/149,784, filed May 8, 2008.
Office Action, dated May 11, 2011, in U.S. Appl. No. 12/149,784, filed May 8, 2008.
Office Action, dated Dec. 3, 2010, in U.S. Appl. No. 12/149,784, filed May 8, 2008.

\* cited by examiner

SYSTEMS AND METHODS FOR ANALYZING PATENT-RELATED DOCUMENTS

BACKGROUND

Technical Field

The present disclosure generally relates to the field of computerized systems. More particularly, the disclosure relates to computerized systems and methods for analyzing patent-related documents.

Background Information

Various databases and tools exist for patent-related documents, such as ones provided by the U.S. Patent and Trademark Office and some foreign patent agencies. Other search tools exist as well, such as, MicroPatent™, PatBase™, and Delphian™. These search tools typically permit users to search for patent-related documents using search terms and other criteria.

Traditional search tools are often limited in their ability to search, filter, and analyze large numbers of patent-related documents. Traditional search tools may locate large numbers of patent-related documents responsive to a query, but do not provide a convenient user interface for filtering and analyzing the patent-related documents to find relevant patent-related documents that are interesting to a user. Accordingly, there exists a need for improved search and analysis tools for patent-related documents.

SUMMARY

Consistent with a disclosed embodiment, a method analyzes patent-related documents having at least one property type. The method includes displaying, in a first graphical element, identifiers of the patent-related documents. The method analyzes, by at least one processor, the patent-related documents to determine at least one property value for the property type. The property value comprises a string of one or more words describing subject matter associated with the patent-related documents and occurring in a subset of the patent-related documents. The method further includes displaying a second graphical element associated with the property type, the second graphical element including the property value. The method also receives, at the second graphical element, a user selection of the property value. The method further displays, in the first graphical element, identifiers of the subset of the patent-related documents in which the property value occurs.

Consistent with a disclosed embodiment, a computer-readable medium is provided. The computer-readable medium comprises program instructions which, when executed by at least one processor, cause the processor to perform a method that analyzes patent-related documents having at least one property type. The method includes displaying in a first graphical element, identifiers of the patent-related documents. The method analyzes the patent-related documents to determine at least one property value for the property type. The property value includes a string of one or more words describing subject matter associated with the patent-related documents and occurring in a subset of the patent-related documents. The method displays a second graphical element associated with the property type, the second graphical element including the property value. The method further includes receiving, at the second graphical element, a user selection of the property value. The method further displays, in the first graphical element, identifiers of the subset of the patent-related documents in which the property value occurs.

Consistent with a disclosed embodiment, a method analyzes of patent-related documents having at least one property type. The method includes retrieving, from a storage, the patent-related documents. The method analyzes, by at least one processor, the patent-related documents to determine at least one property value for the property type. The property value includes a string of one or more words describing subject matter associated with the patent-related documents and occurring in a first subset of the patent-related documents. The method analyzes a corpus of patent-related documents to determine at least one variant of the property type. The variant is used in the corpus of patent-related documents to refer to the subject matter described by the property value. The variant comprises another string of one or more words occurring in a second subset of the patent-related documents. The method further displays, in a first graphical element, identifiers of the patent-related documents element. The method displays a second graphical element associated with the property type, the second graphical element including the property value. The method receives, at the second graphical element, a user selection of the property value. In response to the user selection, the method displays a third graphical element with the variant. The method further includes receiving a user selection of the variant. The method further displays, in the first graphical element, identifiers of the first subset in which the property value occurs and identifiers of the second subset in which the variant occurs.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this specification, illustrate disclosed embodiments and together with the description, serve to explain the principles of the disclosed embodiments.

FIG. 5 illustrates a second graphical interface that may be provided by a Bibliographic Data Filtering Component.

FIG. 6 illustrates a third graphical interface that may be provided by a Bibliographic Data Filtering Component.

FIG. 8 illustrates a fifth graphical interface that may be provided by a Subject Matter Data Filtering Component.

FIG. 12 illustrates a seventh graphical interface of a thesaurus that may be provided by a Variant Determining Component.

FIG. 13 illustrates an eighth graphical interface that may be provided by a Summarizing Component.

DETAILED DESCRIPTION

Figure 1:
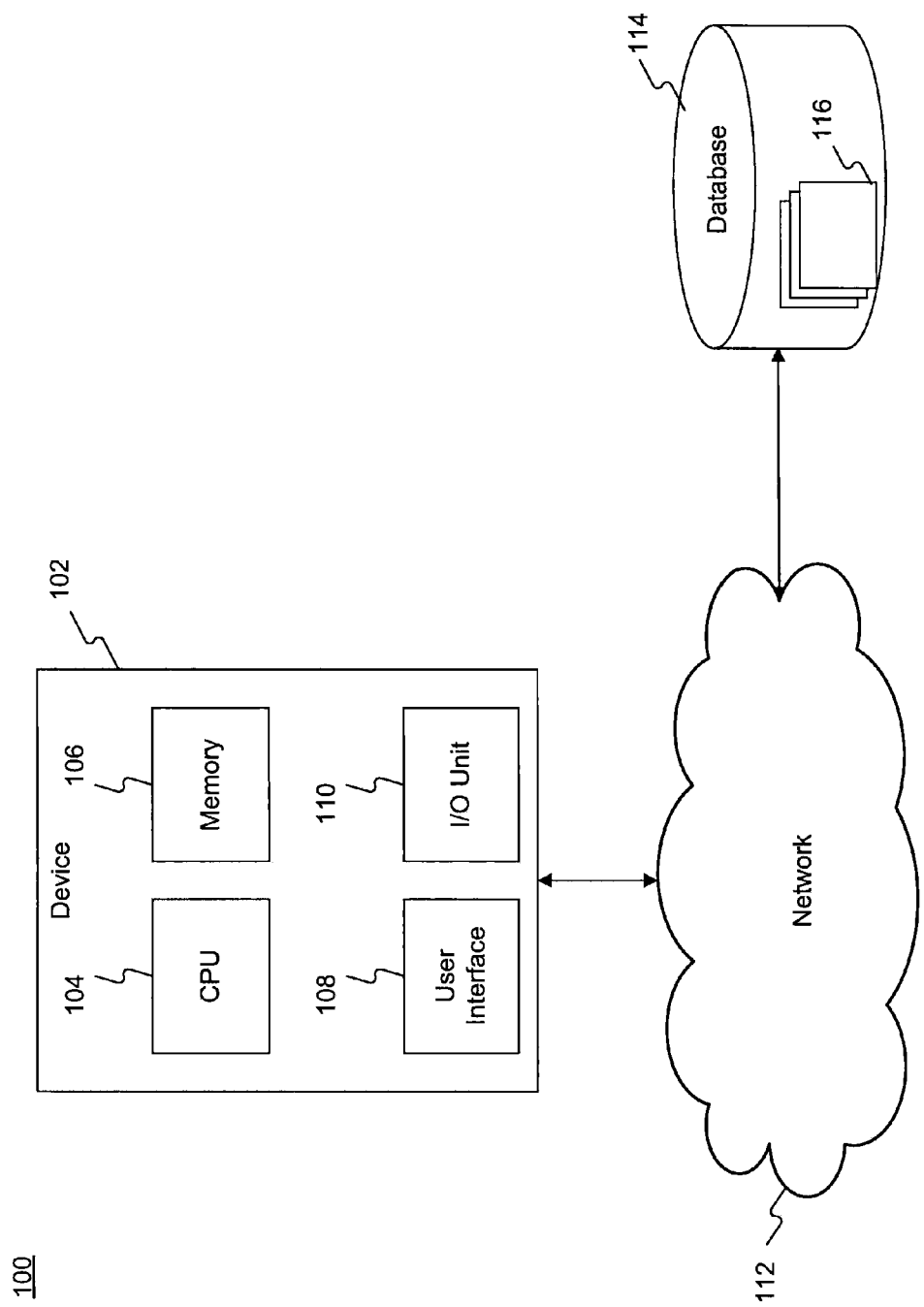
FIG. 1 illustrates an exemplary system, consistent with a disclosed embodiment.

The following detailed description refers to the accompanying drawings. Wherever possible, the same reference numbers are used in the drawings and the following description to refer to the same or similar parts. While several exemplary embodiments are described herein, modifications, adaptations and other implementations are possible, without departing from the spirit and scope of the disclosed embodiments. For example, substitutions, additions or modifications may be made to the components illustrated in the drawings, and the exemplary methods described herein may be modified by substituting, reordering, or adding steps to the disclosed methods. Accordingly, the following detailed description is not limiting. Instead, the proper scope is defined by the appended claims.

Embodiments disclosed herein provide computer-implemented systems and methods for filtering and/or analyzing documents. Although the following discussion may refer to various legal documents, such as patents and published patent applications, one of ordinary skill in the art will understand that systems and methods consistent with the disclosed embodiments may analyze any kind of document.

In the context of patents or published patent applications, as used herein, a "claim element" shall mean a component of an invention that is found in a claims section of a patent application and a "part" shall mean a component of an invention found in a description section of a patent application. The "part" may be a component of a drawing reference, which may include both the part and an identifier, such as a reference number. A "term" shall constitute a word used in a document in a specific way to mean a certain thing. As used herein, a "phrase" may include a string of one or more elements, parts, or terms. In the context of documents, in general, the terms "element," "part," and "phrase" may refer to any word or words in a document.

FIG. 1 illustrates an exemplary system 100, consistent with a disclosed embodiment. Although a specific number of components are depicted in FIG. 1, any number of these components may be provided. Furthermore, the functions provided by one or more components of system 100 may be combined or separated. Moreover, the functionality of any one or more components of system 100 may be implemented by any appropriate computing environment.

With reference to FIG. 1, system 100 may include a device 102, a network 112, and a database 114. Device 102 may perform computing tasks, such as searching for and filtering patent-related documents. For example, device 102 may be a desktop computer, laptop computer, or other handheld or mobile device. Device 102 may include a central processing unit (CPU) 104, a memory 106, a user interface 108, and/or an I/O unit 110.

CPU 104 may execute computer program instructions to perform various processes and methods. CPU 104 may read the computer program instructions from memory 106 or from any computer-readable storage medium included in device 102, external to device 102, or accessible to device 102 over network 112. Memory 106 may include random access memory (RAM) and/or read only memory (ROM) configured to access and store information and computer program instructions. Memory 106 may also include additional memory to store data and computer program instructions, and/or one or more internal databases (not shown) to store tables, lists, or other data structures. Moreover, user interface 108 may access user data, such as a user input for filtering patent-related documents. In some embodiments, user interface 108 may be separate from device 102. User interface 108 may also include a visual display, keyboard, mouse, or touch screen, for example. Furthermore, I/O unit 110 may access data over network 112.

Network 112 may facilitate communications between the various devices in system 100, such as device 102 and database 114. In addition, device 102 may access legacy systems (not shown) via network 112, or may directly access legacy systems, databases, or other network applications. Network 112 may be a shared, public, or private network, may encompass a wide area or local area, and may be implemented through any suitable combination of wired and/or wireless communication networks. Furthermore, network 112 may comprise a local area network (LAN), a wide area network (WAN), an intranet, or the Internet. In some embodiments, network 112 may be substituted with a direct wired or wireless connection between device 102 and database 114.

Database 114 may include documents 116. Documents 116 may be associated with any subject matter, such as legal, scientific, financial, and/or political. In disclosed embodiments, documents 116 may be patent-related documents, such as U.S. patents and/or Published U.S. applications. Documents 116 may also include patents and published applications from other jurisdictions, such as Japan, Europe, China, etc., or under the Patent Cooperation Treaty, for example.

Moreover, although shown as separate components in FIG. 1, database 114 and device 102 may be combined. Moreover, device 102 may include one or more databases in addition to or instead of database 114. Database 114 may also be distributed over multiple databases.

Figure 2:
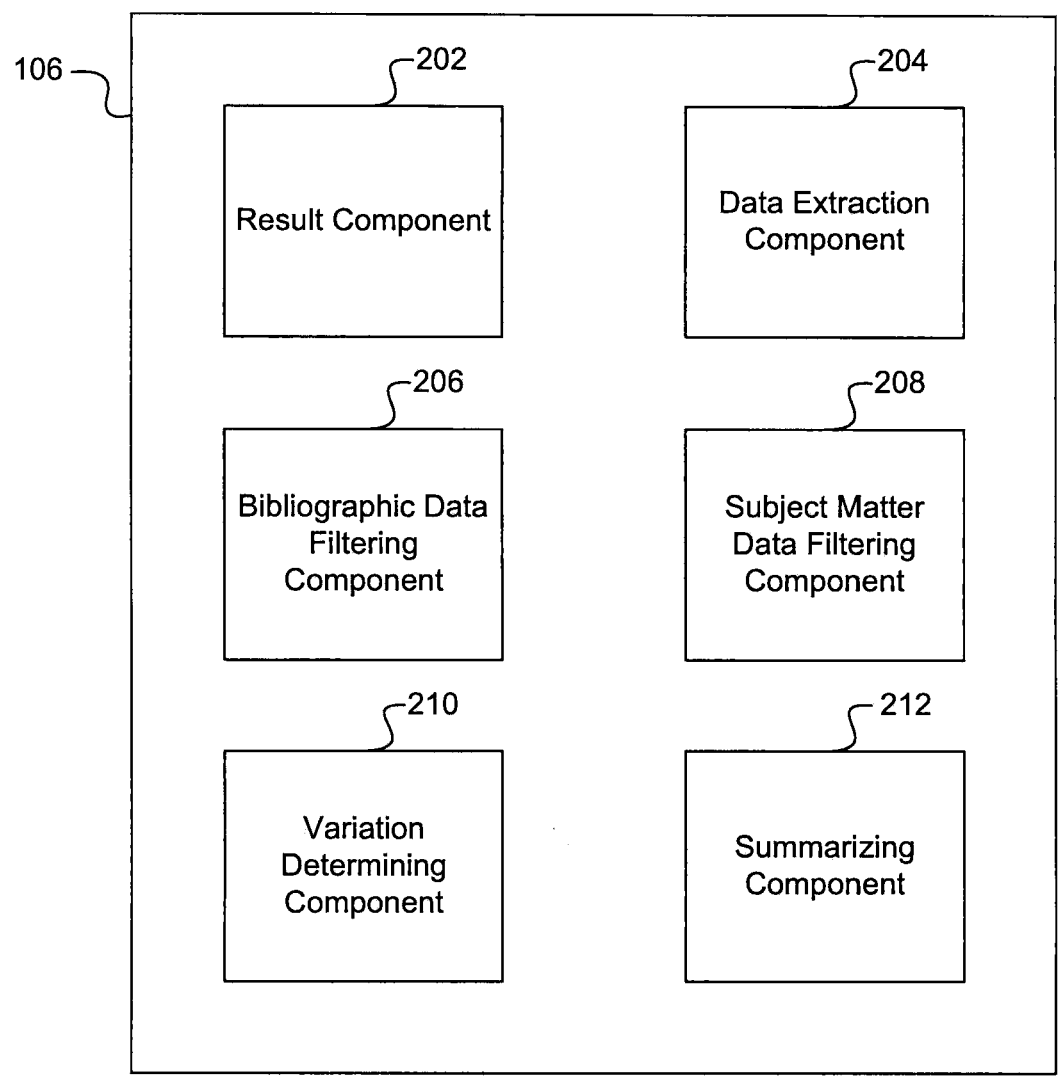
FIG. 2 illustrates a memory including components that may be used for analyzing patent-related documents.

FIG. 2 illustrates memory 106, which includes components that may be used for analyzing patent-related documents. The components in memory 106 may be logical portions or aspects of computer programs or computer program instructions stored in memory 106. These components may be implemented in hardware, software, or firmware, or a combination thereof.

Memory 106 may include a Result Component 202, a Data Extraction Component 204, a Bibliographic Data Filtering Component 206, a Subject Matter Data Filtering Component 208, a Variation Determining Component 210, and a Summarizing Component 212.

Result Component 202 may identify a body of patent-related documents. For example, Results Component 202 may enable a user to input general search terms and retrieve patent-related documents meeting the search terms, from, for example database 114, as shown in FIG. 1. Results Component 202 may list the body of patent-related documents with metadata describing the patent-related documents. Once Results Component 202 determines the body of patent-related documents, data from patent-related documents from the body may be extracted for the purposes of filtering.

Data Extraction Component 204 may extract different types of data occurring in the body of patent-related documents, such as bibliographic data and subject matter data. Bibliographic data may relate to information describing the background or history of a patent-related document. For example, bibliographic data for a patent or published patent application may include: assignee, inventor, legal representative, examiner, U.S. class, international patent classification (IPC), date, and/or citations. Subject matter data, by contrast, may relate to information describing technical aspects or concepts being described or explained in a patent-related document. For example, subject matter data for a patent or published patent application may include: part, term, phrase, or claim element, as defined above.

Bibliographic Data Filtering Component 206 may display property types of the extracted bibliographic data. For example, Bibliographic Data Filtering Component 206 may display different graphical elements for each of the following bibliographic data of: assignee, inventor, legal representative, examiner, U.S. class, international patent classification (IPC), date, and/or citations. Moreover, Bibliographic Data Filtering Component 206 may filter the body of patent-related documents according to a selection of one or more property values associated with the extracted bibliographic data. For example, a user may select a listed law firm as a property value from a graphical element of bibliographic property type "legal representative." Bibliographic Data Filtering Component 206 may then filter the body of patent-related documents and display only those having the selected law firm as its "legal representative." Moreover, in addition to filtering based on bibliographic data, exemplary embodiments may additionally or alternatively filter based on subject matter data.

Subject Matter Data Filtering Component 208 may display property types of the extracted subject matter data. Subject Matter Data Filtering Component 208 may display different graphical elements for each of the following subject matter data of: part, term, phrase, and/or claim element. In each of the different graphical elements, Data Extraction Component 204 may display property values extracted from the body of patent-related documents that correspond to the property type. For example, in a graphical element of a bibliographic property type "legal representative," Data Extraction Component 204 may list all the different law firms occurring as legal representatives within the body of patent-related documents. A user may be able to select one or more of the property values to filter the body of patent-related documents. Subject Matter Data Filtering Component 208 may filter the body of patent-related documents according to a selection of one or more property values associated with the extracted subject matter data. For example, a user may select a part as a subject matter property value from a graphical element of property type "parts." Subject Matter Data Filtering Component 206 may then filter the body of patent-related documents and display only those having the selected part.

Variation Determining Component 210 may determine one or more variants for a subject matter property value. For a subject matter property value (e.g., a particular part, term, phrase, or claim element) used in the body of patent-related documents, a variant may be a different corresponding part, term, phrase, or claim element that is used to represent the same technical aspect or concept. Variation Determining Component 210 may determine the variants by analyzing a corpus of patent-related documents to determine if the variant is used interchangeably with the subject matter property value. The corpus of patent-related documents may be the same, smaller, larger, overlapping, or completely different from the body of patent-related documents determined by Results Component 202. After determining the variants, Variation Determining Component 210 may display the variants in one or more graphical elements for user selection. Variation Determining Component 210 may filter the body of patent-related documents according to the selection of the one or more displayed variants.

Accordingly, in disclosed embodiments, a user may have filtered the body of patent-related documents by selected multiple bibliographic property values, subject matter property values, and/or variants. In some embodiments, these filter values may be combined by logical AND (intersection). In other embodiments, these filter values may be combined by logical OR (union). In other embodiments some of the filter values may be combined by logical AND while others may be combined by logical OR. Any of these logical combinations may be set by a user in an options menu or may be preprogrammed. In some embodiments, in a default setting, filter values within a graphical element may be combined by a logical OR, while filter values among different graphical elements may be combined with a logical AND.

A Summarizing Component 212 may aggregate and display the previously selected bibliographic and subject matter property values. At this stage, Summarizing Component 212 may permit de-selection of any previously selected property value. Moreover, Summarizing Component 212 may display a claim listing and/or full text of the filtered patent-related documents and highlight selected property values and variants within the displayed claim listing or full text.

For example, a user may have previously filtered the body of patent-related documents according to a particular law firm, a particular part, and a variant of the part. Summarizing Component 212 may display a filtered subset of the body patent-related documents that contain those selected property values. For each patent-related document in the subset, Summarizing Component 212 may enable a user to view the full text patent-related document. Within the full text, Summarizing Component 212 may highlight the particular law firm used as the filter value in a first color. Summarizing Component 212 may further highlight the particular part in a second color, which may be different from the first color. Moreover, in some embodiments, Summarizing Component 212 may highlight the variant of the particular part in a common (i.e., the same) second color as the part, in order to indicate that the part and the variant are used interchangeably and represent the same technical aspect or concept. One of ordinary skill will appreciate that any other visual representation or identifier may be used instead of color, such as highlighting, shading, hatching, etc.

Figure 3:
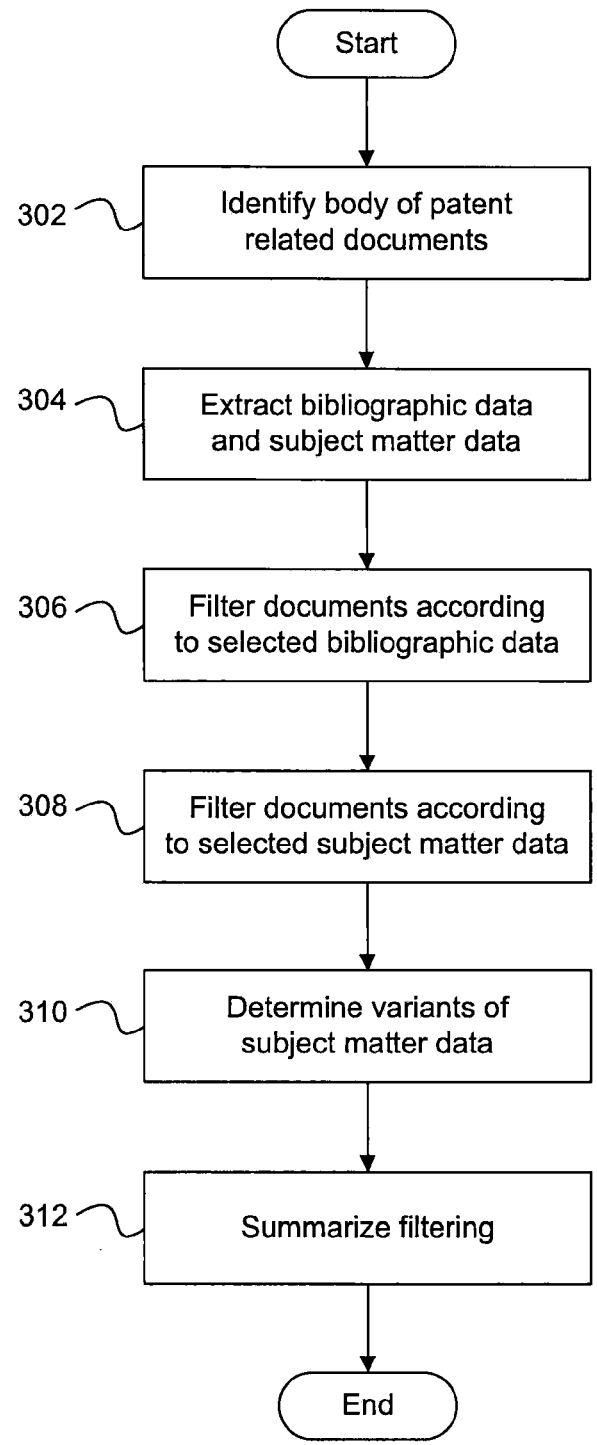
FIG. 3 illustrates a flow diagram of a method that may be used for analyzing patent-related documents.

FIG. 3 illustrates flow diagram 300 of a method that may be used for analyzing patent-related documents. At block 302, Result Component 202 may identify a body of patent-related documents, for example, in response to initial criteria or search terms entered by a user. At block 304, Data Extraction Component 204 may extract bibliographic data and/or subject matter data from the body of patent-related documents. As discussed, bibliographic data may relate to information describing the background or history of a patent-related document, while subject matter data, by contrast, may relate to information describing technical aspects or concepts being described or explained in a patent-related document.

At block 306, Bibliographic Data Filtering Component 206 may filter the body of patent-related documents according to selected bibliographic data. In particular, a user may have selected one or more displayed bibliographic property values and Bibliographic Data Filtering Component 206 may filter the body of patent-related documents into a subset that includes the selected one or more bibliographic property values.

At block 308, Subject Matter Data Filtering Component 208 may filter the body of patent-related documents according to selected subject matter data. In particular, a user may have selected one or more displayed subject matter property values, and Subject Matter Data Filtering Component 208 may filter the body of patent-related documents into a subset that includes the selected one or more subject matter property values.

At block 310, Variation Determining Component 210 may determine variants for the subject matter data, for example, the subject matter property values selected in block 308. As discussed, for a subject matter property value (e.g., a particular part, term, phrase, or claim element) used in the body of patent-related documents, a variant may be a different corresponding part, term, phrase, or claim element that is used to represent the same technical aspect or concept. Variation Determining Component 210 may filter the body of patent-related documents into a second subset that includes selected variants.

At block 312, Summarizing Component 212 may display a summary of the filter values selected in blocks 306-310 and may enable a user to view a claim listing and/or full text of the filtered patent-related documents. When the full text of a document is displayed, Summarizing Component 212 may highlight selected property values with a visual representation.

Figure 4:
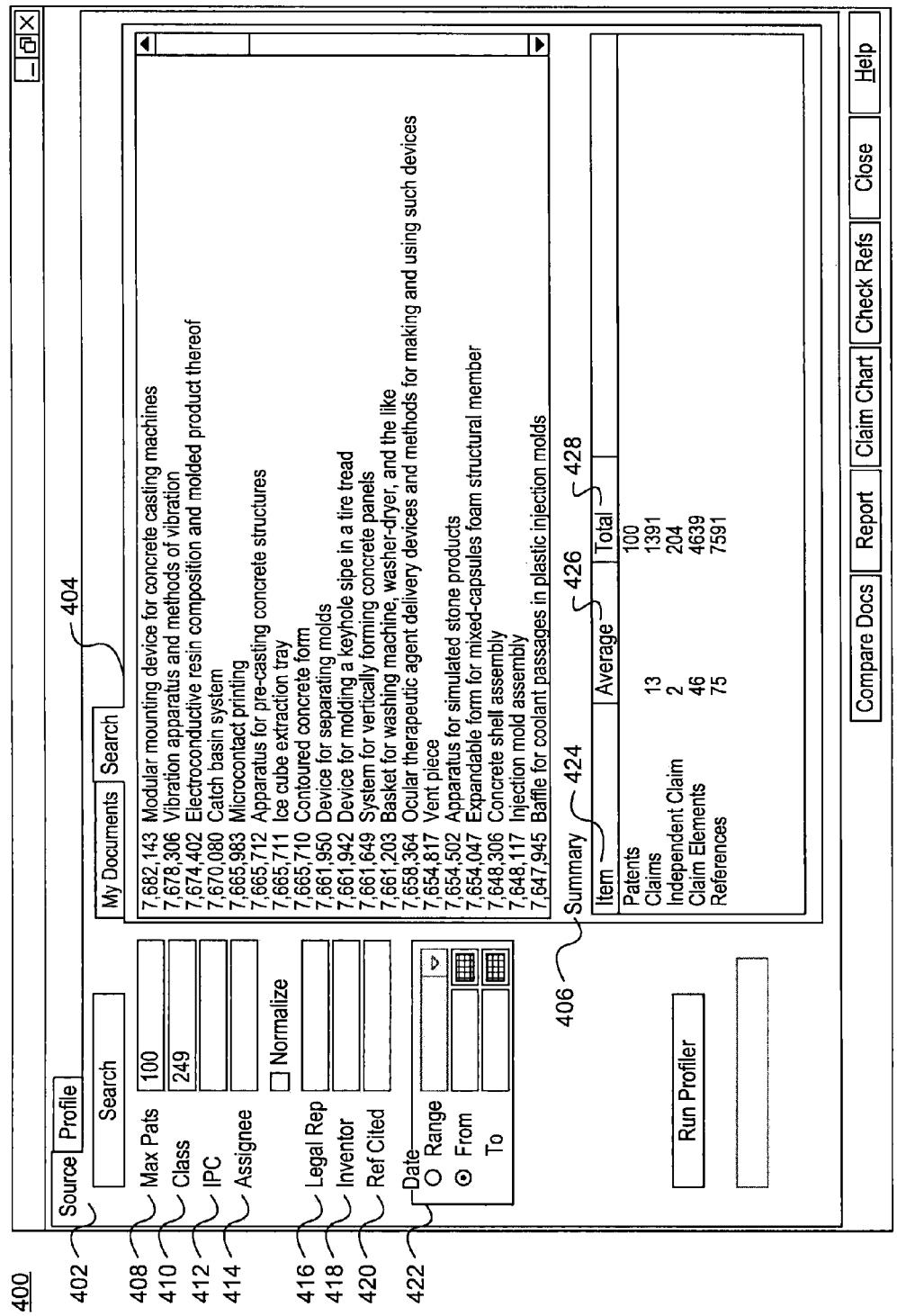
FIG. 4 illustrates a first graphical interface that may be provided by a Result Component.

FIG. 4 illustrates a first graphical interface 400, which may be provided by Result Component 202. In particular, graphical interface 400 may be presented to a user in order to identify a body of patent-related documents.

Graphical interface 400 may include a search term area 402, a search result area 404, and a search summary area 406. Search term area 402 may enable a user to enter general search terms for identifying a body of patent-related documents. Search result area 404 may list the body of patent-related documents. Search summary area 406 may summarize information about the body of patent-related documents.

In particular, search term area 402 may include the following search terms: Maximum Patents 408, Class 410, IPC 412, Assignee 414, Legal Representative 416, Inventor 418, References Cited 420, and Date 422. Maximum Patents 408 may specify the maximum number of patents to be returned in the search. Class 410 may refer to a particular class in the U.S. patent classification system. In graphical interface 400, the value of Class 410 is 249, which refers to "Static Molds" in the U.S. patent classification system. In some embodiments, Class 410 may refer to a particular class in a foreign or other classification system. Moreover, IPC 412 may refer a class in the International Patent Classification system.

Assignee 414 may relate to assignee information listed on one or more patent-related documents. In disclosed embodiments, the assignee information may be recorded by the U.S. Patent and Trademark Office or other foreign patent office, and may be available via an online resource or other resource. Alternatively, the assignee information may be stored in any other location or may be made available by any other means.

Legal representative 416 may relate to an attorney or law firm, which prosecuted one or more patent-related documents. Inventor 418 may relate to an inventor of one or more patent-related documents. References Cited 420 may relate to references cited by one or more patent-related documents. Date 422 may relate to a date or date range of one or more patent-related documents.

Moreover, search result area 404 may list the body of patent-related documents identified by the search terms in search term area 402. Search result area 404 may identify the body of patent-related documents by number (e.g., U.S. patent number) and/or title.

In some embodiments, the body of patent-related documents may be loaded from a client-side storage location, or any other database. Moreover, in some embodiments, a user may enter a list of patents to be included in the body of patent-related documents. Furthermore, in some embodiments, one or more patent-related lists may be received from a search tool and processed to determine the body of patent related documents.

Search summary area 406 may summarize information about the body of patent-related documents. Search summary area may include item field 424, average field 426, and total field 428. Item field 424 may provide a feature about the patent-related documents. For example, item field 424 includes "Patents," "Claims," "Independent Claims," "Claim Elements," and "References." Average field 426 provides average values corresponding to the features in item field 424. For example, average field 426 indicates that there are an average of 13 claims in each patent-related document in the body, with an average of 2 independent claims. Average field 426 further indicates that there is an average of 46 claim elements in each of the patent-related documents in the body and 75 cited references.

For one or more of the items in item field 424, total field 428 may provide the total number of items. For example, for "References" in item field 424, total field 428 indicates that there are 7591 references cited in the body of patent related documents. In some embodiments, total field 428 may count references (or other items) multiple times. In some embodiments, search summary area 406 may include another field (not shown) including the unique number of items associated with an item in item field 426. The unique number of items may not include duplicates.

Figure 5:
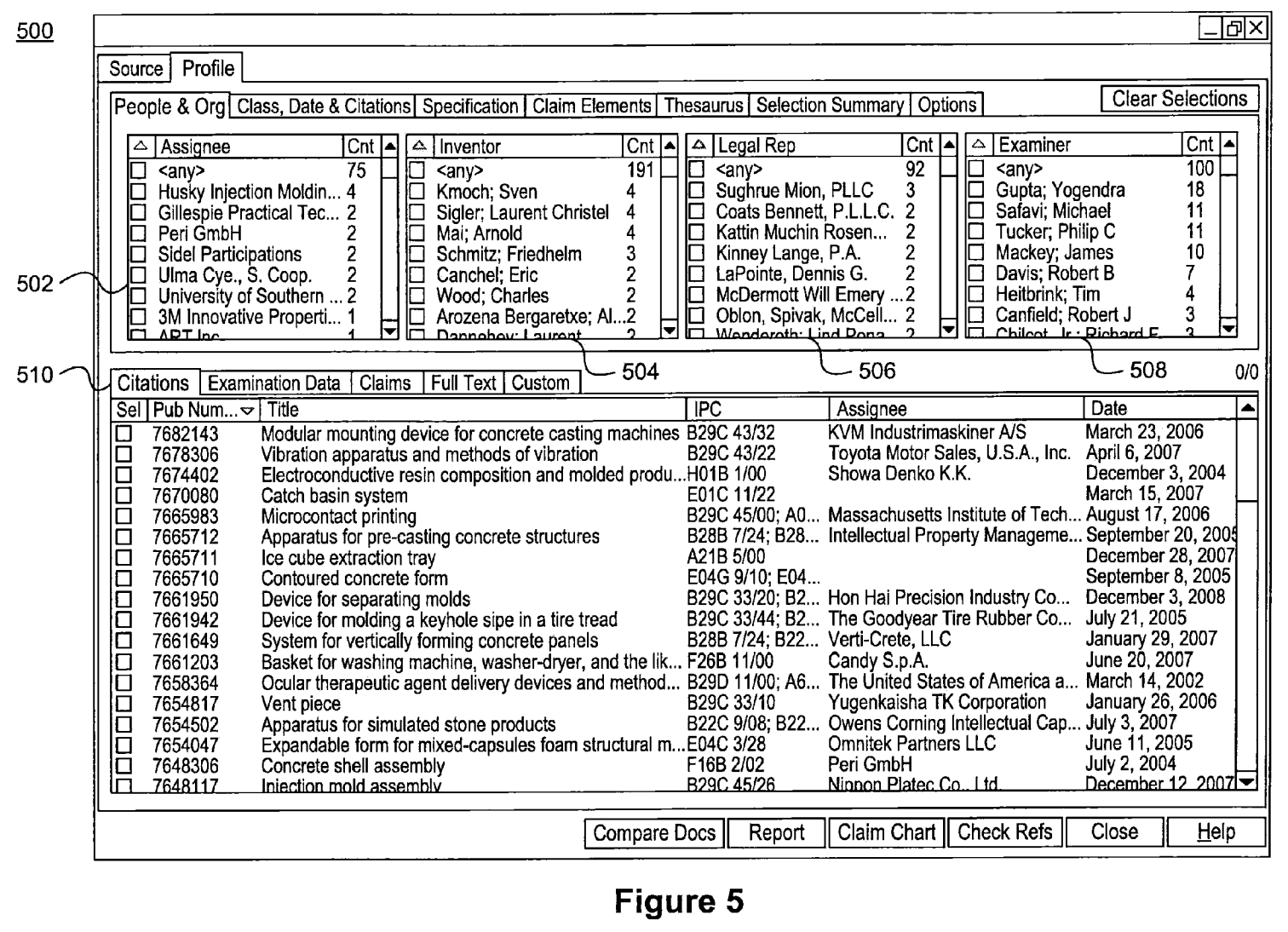

FIG. 5 illustrates a second graphical interface 500 that may be provided by Bibliographic Data Filtering Component 206. In particular, Bibliographic Data Filtering Component 206 may display bibliographic data extracted from the body of patent-related documents by Data Extraction Component 204.

Graphical interface 500 includes graphical elements 502-508, each of which is associated with a bibliographic property type. Moreover, each of the graphical elements may list property values corresponding to the property type of the graphical element.

For example, the property type of graphical element 502 is "Assignee" and the property values may be different assignees extracted from the body of patent-related documents. Similarly, the property type of graphical element 504 is "Inventor" and the property values may be different inventor names extracted from the body of patent-related documents. Also, the property type of graphical element 506 is "Legal Representative" and the property values may be different attorney or law firm names that were extracted from the body of patent-related documents. Finally, the property type of graphical element 508 is "Examiner" and the property values may be different patent examiner names that were extracted from the body of patent-related documents.

In disclosed embodiments, property values for a particular property type may be ranked and ordered in their associated graphical element. For example, in graphical element 502, each of the listed assignees (i.e., property values) include a count value ("Cnt"). The count value may indicate the number of patent-related documents in which the particular assignee (i.e., property value) occurs throughout the body of patent-related documents. For graphical element 502, the assignee "Husky" occurs in 4 different patent-related documents in the body, while the assignee "Gillespie" occurs in 2 different patent-related documents in the body. Accordingly, "Husky" may be ranked higher than "Gillespie" and in the order of property values listed in graphical element 502, the assignee "Husky" may be displayed higher or before "Gillespie." Bibliographic Data Filtering Component 206 may perform and display similar ranking and ordering for graphical elements 504-508 as well.

Moreover, each of graphical elements 502-508 may permit a user to select one or more of the listed property values to filter the body of patent-related documents. The filtered patent-related documents may be identified and listed in citations list 510. The filtered patent-related documents may be a subset of the body of patent-related documents, depending on the property values selected by the user in graphical elements 502-508. Citation list 510 may display identifiers and metadata of the filtered patent-related documents. For example, citation list 510 may display a publication number, title, IPC, assignee, and date for each of the filtered patent-related documents. In some embodiments, citation list may display the total number of claims, number of independent claims, and/or number of dependent claims for each of the filtered patent-related documents.

Moreover, in response to receiving a user selection of a property value at graphical elements 502-508, Bibliographic Data Filtering Component 206 may render unselectable those property values that do not coexist in the body of patent-related documents with the selected property value. For example, if a user selects the property value "Husky" from graphical element 502, Bibliographic Data Filtering Component 206 may render unselectable the remaining property values in graphical element 502. This may be because other assignees do not occur together with "Husky" in the same patent-related document from the body of patent-related documents. Indeed, patent-related documents typically have a single assignee. If there existed a patent-related document from the body of patent-related documents, which did include another assignee besides "Husky," then Bibliographic Data Filtering Component 206 would not render unselectable this another assignee.

In other embodiments, Bibliographic Data Filtering Component 206 may not render unselectable the remaining property values in graphical element 502, after selection of "Husky." This may broaden the results of the filtering. Indeed, by permitting further selections of property values from graphical element 502, Bibliographic Data Filtering Component 206 may include additional patent-related documents from the body of patent-related documents. For example, a user may select both "Husky" and "Gillespie" from graphical element 502, which may return patent-related documents having an assignee of either "Husky" or "Gillespie." This is because selected property values within a graphical element may be combined with a logical OR operation.

Bibliographic Data Filtering Component 206 may render unselectable certain property values in different graphical elements, if those property values do not occur in the body of patent-related documents together with a selected property value. This is because selected property values among different graphical elements may be combined with a logical AND operation. For example, if "Husky" is selected in graphical element 502, Bibliographic Data Filtering Component 206 may render unselectable certain inventor property values in graphical element 504, if certain inventor names do not coexist with the assignee "Husky" in the same patent-related document, from the body of patent-related documents. Similarly, Bibliographic Data Filtering Component 206 may also render unselectable certain property values in graphical elements 506 and 508.

Bibliographic Data Filtering Component 206 may render unselectable property values by removing them, graying them out, highlighting them, highlighting the remaining selectable property values, or by any other indication. Moreover, Bibliographic Data Filtering Component 206 may reorder the property values that remain selectable in graphical elements 502-508.

Patent-related documents may be selected from citation list 510. In some embodiments, a selection of a patent-related document from citation list 510 may cause reordering and/or highlighting of property values in graphical elements 502-508. For example, if U.S. Pat. No. 7,682,143 is selected in citation list 510, then the assignee associated with this selected patent may be highlighted in graphical element 502 and/or placed at the top of graphical element 502. This selection and/or reordering may also occur for property values in one or more of graphical elements 504-508.

Figure 6:
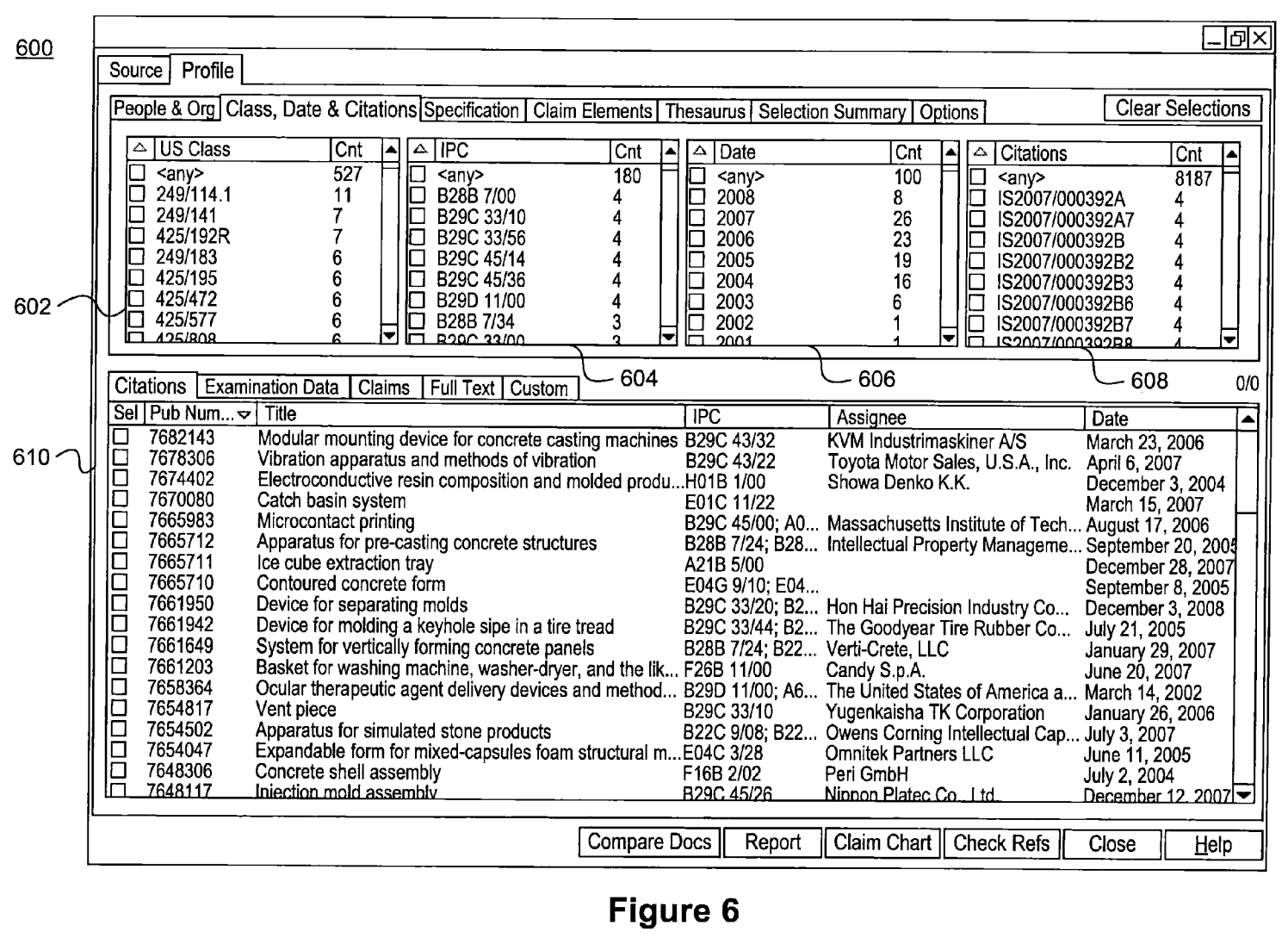

FIG. 6 illustrates a third graphical interface 600, which may also be provided by Bibliographic Data Filtering Component 206. Graphical interface 600 includes graphical elements 602-608, each of which is associated with a bibliographic property type. Moreover, each of the graphical elements may list bibliographic property values corresponding to the property type of the graphical element.

For example, the property type of graphical element 602 is "U.S. Class" and the property values may be different U.S. Classes extracted from the body of patent-related documents. Similarly, the property type of graphical element 604 is "IPC" and the property values may be different international patent classifications extracted from the body of patent-related documents. Also, the property type of graphical element 606 is "Date" and the property values may be different dates (e.g., filing dates or publication dates) extracted from the body of patent-related documents. Some embodiments may include separate tabs (not shown) for the filing date and grant date of a patent-related document. Finally, the property type of graphical element 608 is "Citations" and the property values may be different document citations extracted from the body of patent-related documents.

In disclosed embodiments, property values for a particular property type may be ranked and ordered in their associated graphical element, in a manner similar to that discussed above with respect to graphical interface 500. Moreover, each of graphical elements 602-608 may permit a user to select one or more of the listed property values to filter the body of patent-related documents. The filtered patent-related documents may be identified and listed in citations list 610, in a manner similar to that discussed above with respect to graphical interface 500.

Moreover, in response to receiving a user selection of a property value at graphical elements 602-608, Bibliographic Data Filtering Component 206 may render unselectable those property values that do not coexist in the body of patent-related documents with the selected property value, in a manner similar to that discussed above with respect to graphical interface 500.

Figure 7:
FIG. 7 illustrates a fourth graphical interface that may be provided by a Subject Matter Data Filtering Component.

FIG. 7 illustrates a fourth graphical interface 700, which may be provided by Subject Matter Data Filtering Component 208. Graphical interface 700 may include graphical elements 702-706, each of which may be associated with a subject matter property type. Moreover, each of the graphical elements may list property values corresponding to the property type of the graphical element.

For example, the property type of graphical element 702 is "Part" and the property values may be different parts (as defined previously) extracted from the body of patent-related documents. Similarly, the property type of graphical element 704 is "Term" and the property values may be different terms (as defined previously) extracted from the body of patent-related documents. Also, the property type of graphical element 706 is "Phrase" and the property values may be different phrases (as defined above) extracted from the body of patent-related documents.

In disclosed embodiments, property values for a particular property type may be ranked and ordered in their associated graphical element, in a manner similar to that discussed above with respect to graphical interface 500. Moreover, each of graphical elements 702-706 may permit a user to select one or more of the listed property values to filter the body of patent-related documents. The filtered patent-related documents may be identified and listed in citations list 708, in a manner similar to that discussed above with respect to graphical interface 500.

Moreover, in response to receiving a user selection of a property value at graphical elements 702-706, Subject Matter Data Filtering Component 208 may render unselectable those property values that do not coexist in the body of patent-related documents with the selected property value, in a manner similar to that discussed above with respect to graphical interface 500.

Fourth graphical interface 700 may also include graphical element 710, which may include definitions. In some embodiments, graphical element 710 may be included as a separate tab. In the body of patent-related documents, certain terms or phrases may be explicitly defined. Disclosed embodiments may employ regular expression algorithms and/or pattern matching to identify definitions occurring in the body of patent-related documents. Accordingly, graphical element 710 may include terms, definitions of the terms, and locations of the definitions.

This feature may be useful for determining, for example, a standard grammar used by a legal representative, assignee, or applicant. For example, a user may specify the body of patent-related document for a particular assignee, and then view the definitions in the body of patent-related documents, which are used by the particular assignee. In this way, definitions typically used by the assignee may be identified.

In some embodiments, similar (but different) definitions may be nevertheless grouped together and counted. For example, multiple similar definitions may be determined for a term, but only one of the similar definitions may be shown in graphical element 710 as associated with the term. In some embodiments, graphical element 710 may include a count, indicating a number of times the term is defined in the body of patent-related documents. The count may include the similar definitions, even though there may be differences among the similar definitions.

Figure 8:
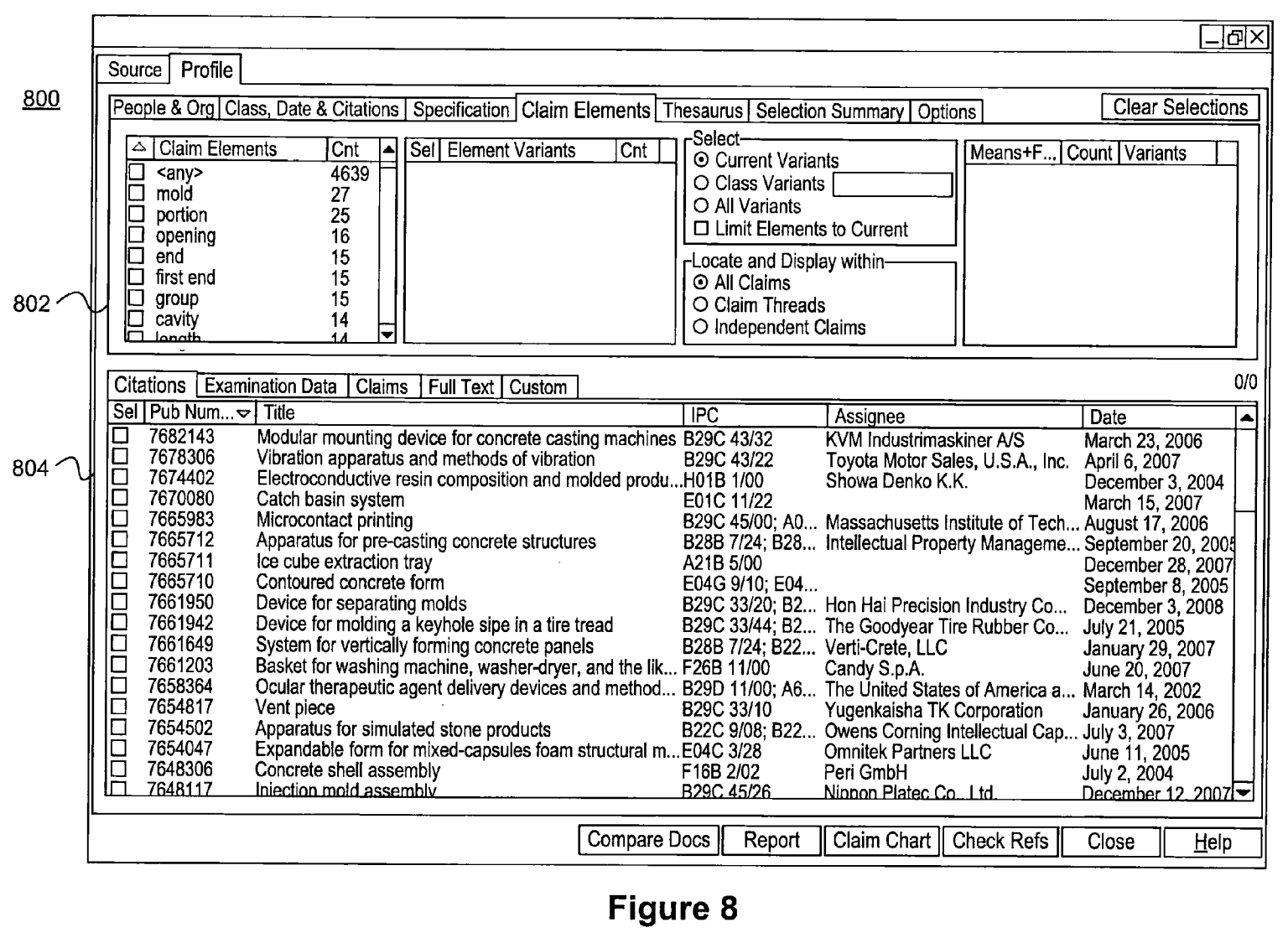

FIG. 8 illustrates a fifth graphical interface 800, which may be provided by Subject Matter Data Filtering Component 208. Graphical interface 800 may include graphical element 802, which is associated with a subject matter property type. Moreover, graphical element 802 may list property values corresponding to its property type. For example, the property type of graphical element 802 is "Claim Elements" and the property values may be different claim elements (as defined previously) extracted from the body of patent-related documents.

In disclosed embodiments, property values for a particular property type may be ranked and ordered in their associated graphical element, in a manner similar to that discussed above with respect to graphical interface 500. Moreover, graphical element 802 may permit a user to select one or more of the property values to filter the body of patent-related documents. The filtered patent-related documents may be identified and displayed in citations list 804, in a manner similar to that discussed above with respect to graphical interface 500.

Moreover, in response to receiving a user selection of a property value at graphical element 802, Subject Matter Data Filtering Component 208 may render unselectable those property values that do not coexist in the body of patent-related documents with the selected property value, in a manner similar to that discussed above with respect to graphical interface 500.

Figure 9:
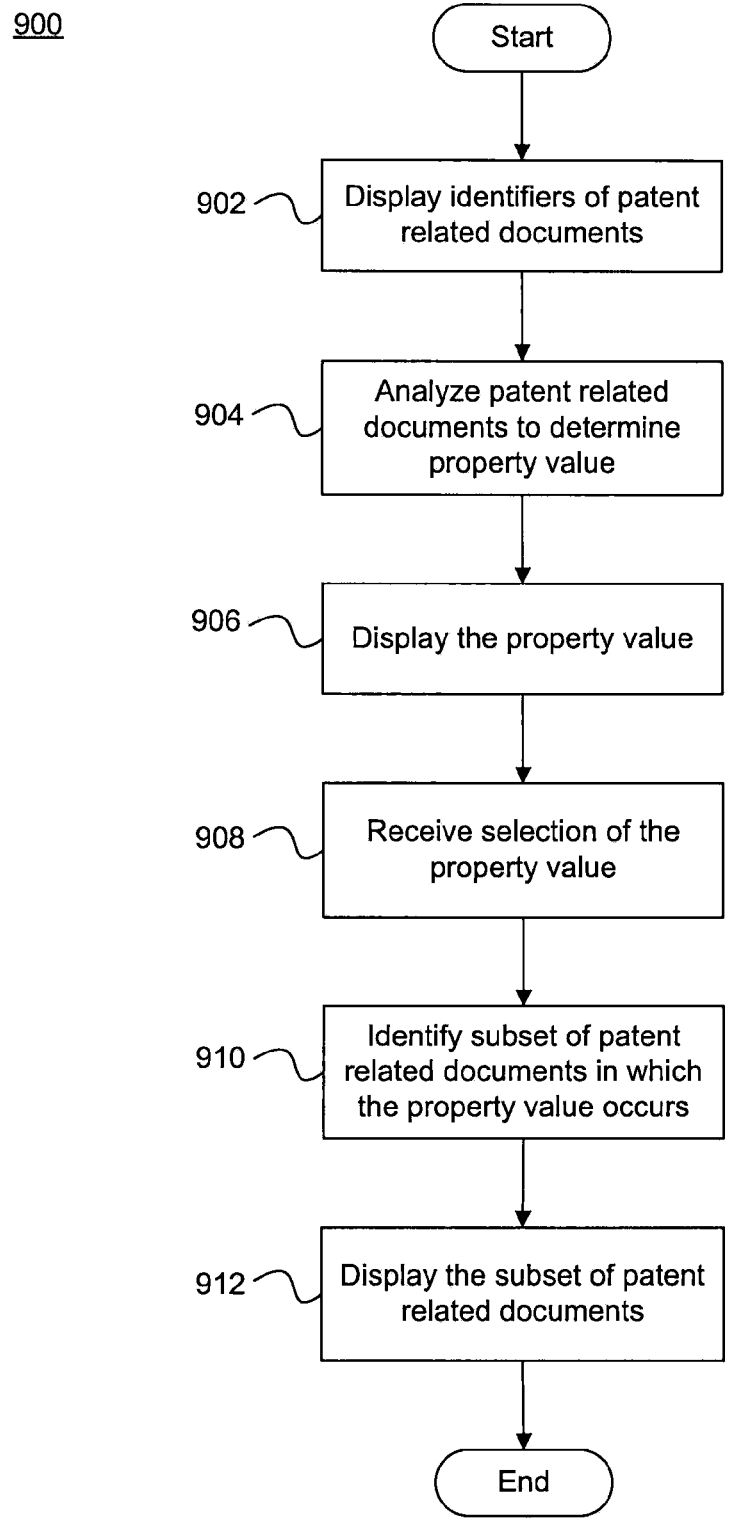
FIG. 9 illustrates a flow diagram of a method for displaying a property value for filtering a body of patent-related documents.

FIG. 9 illustrates a flow diagram 900 that summarizes a display and selection of a property value for filtering a body of patent-related documents. The steps in flow diagram 900 may be performed by one or more of components 202-212 (FIG. 2), which may execute on a processor, such as CPU 104 (FIG. 1).

At block 902, CPU 104 may display identifiers of the body of patent-related documents. As discussed, the body of patent-related documents may be identified by Result Component 202 after searching for patent-related documents based on search terms entered in screen shot 400 (FIG. 4).

At block 904, CPU 104 may analyze the body of patent-related documents to determine property values for property types, by executed Data Extraction Component 204. At block 906, CPU 104 may cause the display of the property values. For example, graphical elements 502-508 (FIG. 5), 602-608 (FIG. 6), 702-706 (FIG. 7), and 802 (FIG. 8) are associated with a different property type and display property values associated with the corresponding property type.

At block 908, CPU 104 may receive a selection of one or more the displayed property values. At block 910, CPU 104 may determine a subset of the body of patent-related documents, in which the selected property value occurs. For example, CPU 104 may filter the body of patent-related documents so that only the subset remain. At block 912, CPU 104 may cause a display of the subset of patent-related documents. For example, CPU 104 may replace the previously displayed body of the patent-related documents with the subset of the patent-related documents. This may involve removing the patent-related documents from the body that are not in the subset. In exemplary embodiments, the subset of patent-related documents may be displayed in citations list 510 (FIG. 5), citations list 610 (FIG. 6), citations list 708 (FIG. 7), and citations list 804 (FIG. 8).

Figure 10:
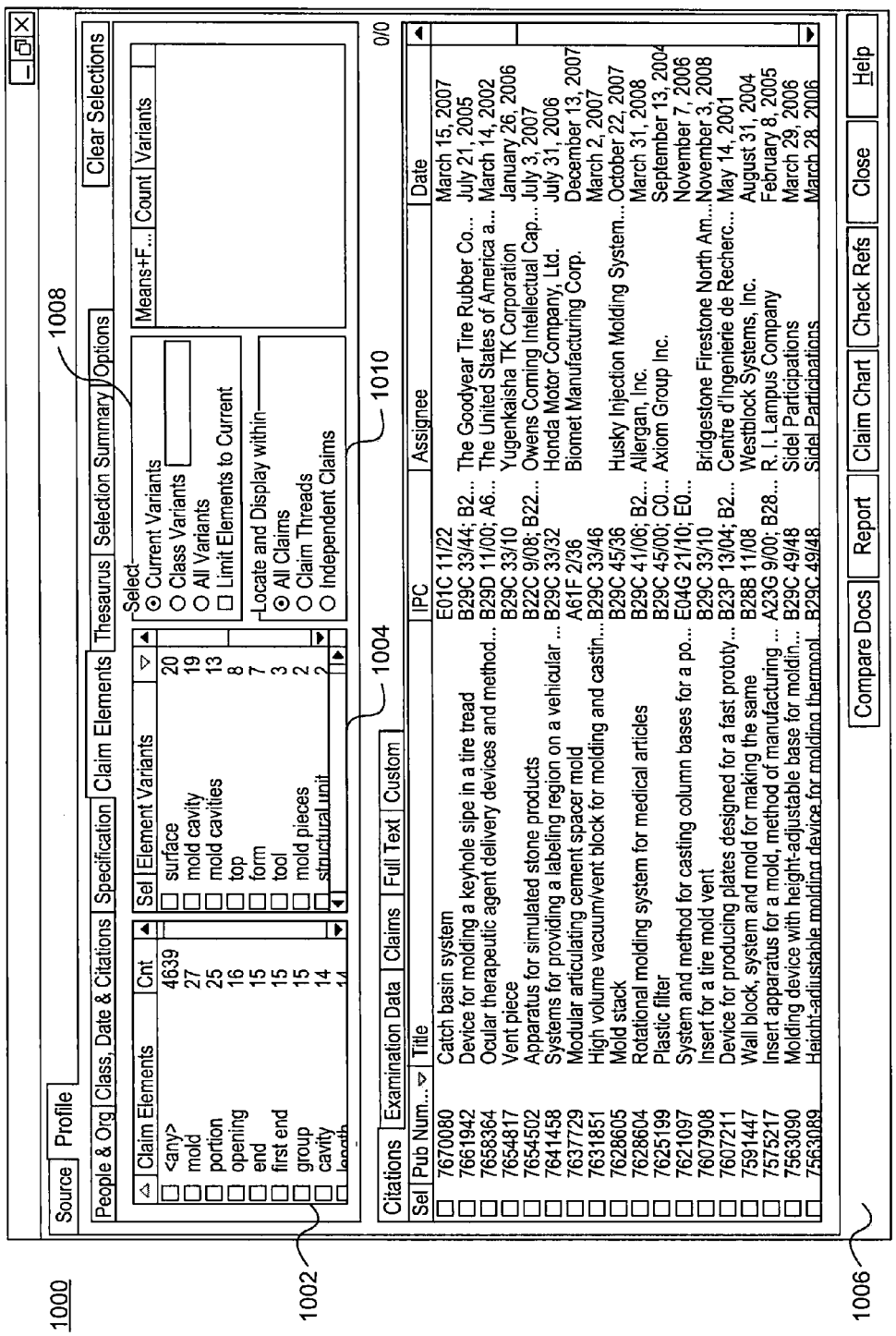
FIG. 10 illustrates a sixth graphical interface that may be provided by a Variant Determining Component.

FIG. 10 illustrates a sixth graphical interface 1000 that may be provided by Variant Determining Component 210. Graphical interface 1000 may include graphical element 1002, which is associated with a subject matter property type and which may be similar to graphical element 802 (FIG. 8). Moreover, graphical element 1002 may list property values corresponding to its property type. For example, the property type of graphical element 1002 is "Claim Elements" and the property values are different claim elements (as defined previously) extracted from the body of patent-related documents.

Graphical interface 1000 may also include graphical element 1004, which may list variants for a claim element listed in graphical element 1002. Generally, for a subject matter property type (e.g., part, term, phrase, or claim element) used in the body of patent-related documents, a variant may be a different corresponding part, term, phrase, or claim element that is used to represent the same technical aspect or concept.

For example, in graphical element 1002, it is seen that the claim element property value "mold" is selected, as shown by the check box. When this selection occurs, Variation Determining Component 210 may update graphical element 1004 to show variants of "mold." Variants of "mold" displayed in graphical element 1004 include "surface," "mold cavity," "mold cavities," etc. In this example, these variants are claim elements that may be used synonymously in place of "mold." A user may select any of the variants in graphical element 1004 to filter the body of patent-related documents.

Claim elements selected from graphical element 1002 may be logically ORed with their associated variants selected in graphical element 1004. In this way, the filtered patent-related documents displayed in citation list 1006 includes both patent-related documents that include the selected claim element(s), and patent-related documents that include the selected variant(s). In this way, patent-related documents that describe the same conceptual ideas, but use slightly different language are not missed in the filtering.

Graphical interface 1000 also includes graphical element 1008 for defining a corpus of patent-related documents in which to search for variants. Specifically, when determining variants for a claim element, Variation Determining Component 210 may analyze a corpus of patent-related documents to see which terms are commonly used interchangeably with the claim element. These terms may then be identified and displayed to the user as variants, Graphical element 1008 may enable a user to select the corpus to be analyzed in order to determine the variants.

In graphical interface 1000, graphical element 1008 allows the user to select between "Current Variants," "Class Variants," and "All Variants." By selecting "Current Variants," the user may direct Variation Determining Component 210 to analyze the body of patent-related documents initially determined by Results Component 202. In alternate embodiments, the selection of "Current Variants" may direct Variation Determining Component 210 to analyze the patent-related documents filtered thus far by Bibliographic Data Filtering Component 206 and/or Subject Matter Data Filtering Component 208.

Alternatively, by selecting "Class Variant", the user may direct Variation Determining Component 210 to analyze patent-related documents belonging to one or more classes. In some embodiments, the class may include a class from the U.S. Classification System. In other embodiments, the class may be any other type of categorization of classification system, such as an international or other jurisdiction classification. In some embodiments, this may include all U.S. patents and/or published U.S. patent applications.

By selecting "All Variants," the user may direct Variation Determining Component 210 to analyze patent-related documents that are available. This may be a significantly larger corpus of patent-related documents that the ones selected by "Current Variants" or "Class Variant."

Moreover, by checking the box "Limit Elements to Current," the user may direct Variation Determining Component 210 to calculate variants from the filtered patent-related document in citation list 1006, provided that the patent-related document is listed in citation list 1006.

Graphical interface 1000 also includes graphical element 1010 for defining a group of claims in which claim elements can occur. If the selected claim elements all occur in the defined group of claims for a patent-related document, then the patent-related document may be included in citation list 1006. In particular, after determining selected claim elements, Variation Determining Component 210 may identify and display patent-related documents that include the selected claim elements (or their associated variants) in a certain document section. The document sections are listed in graphical element 1010 as "All Claims," "Claim Threads," and "Independent Claims."

By selecting "All Claims," the user may direct Variation Determining Component 210 to display a patent-related document in citation list 1006, provided that the patent relate document includes the selected claim elements (or their selected variants) in the claims. In other words, for display, the selected claim elements (or their selected variants) should occur in any claim of the patent-related document.

Alternatively, by selecting "Claim Threads," the user may direct Variation Determining Component 210 to display a patent-related document in citation list 1006, provided that the patent-related document includes the selected claim elements (or their selected variants) in any single claim thread. In other words, for display, the selected claim elements (or their selected variants) should all occur within a claim thread of the patent-related document. In disclosed embodiments, a claim thread is a set of claims including a single independent claim and all of its dependent claims.

By selecting "Independent Claims," the user may direct Variation Determining Component 210 to display a patent-related document in citation list 1006, provided that the patent-related document includes the selected claim elements (or their selected variants) in any independent claim. In other words, for display, the selected claim elements (or their selected variants) should all occur in an independent claim of the patent-related documents.

In disclosed embodiments, property values for a particular property type may be ranked and ordered in their associated graphical element, in a manner similar to that discussed above with respect to graphical interface 500. Moreover, graphical elements 1002 and 1004 may permit a user to select one or more of the listed property values to filter the body of patent-related documents. The filtered patent-related documents may be identified and listed in citations list 1006, in a manner similar to that discussed above with respect to graphical interface 500.

Moreover, in response to receiving a user selection of a property value at graphical element 1002, Subject Matter Data Filtering Component 208 may render unselectable those property values that do not coexist in the body of patent-related documents with the selected property value, in a manner similar to that discussed above with respect to graphical interface 500.

In some embodiments, Subject Matter Data Filtering Component 208 may determine antecedent basis for selected claim elements. In particular, Subject Matter Data Filtering Component 208 may determine a part or phrase in the description (and a location of the part or phrase), which provides antecedent basis for a selected claim element. In some embodiments, Subject Matter Data Filtering Component 208 may use "fuzzy matching" to determine a part or phrase similar to the selected claim element, which may not match exactly with the selected claim element. The fuzzy matching may identify locations of variants of the selected claim elements in the description. In some embodiments, Subject Matter Data Filtering Component 208 may also similarly identify antecedent basis for means plus function limitations.

When identifying antecedent basis, Subject Matter Data Filtering Component 208 may also identify drawing references. For example, if a particular part is associated with a selected claim element (or its variant), then the drawing reference associated by the part may be identified in an appropriate figure as providing antecedent basis for the selected claim term.

Figure 11:
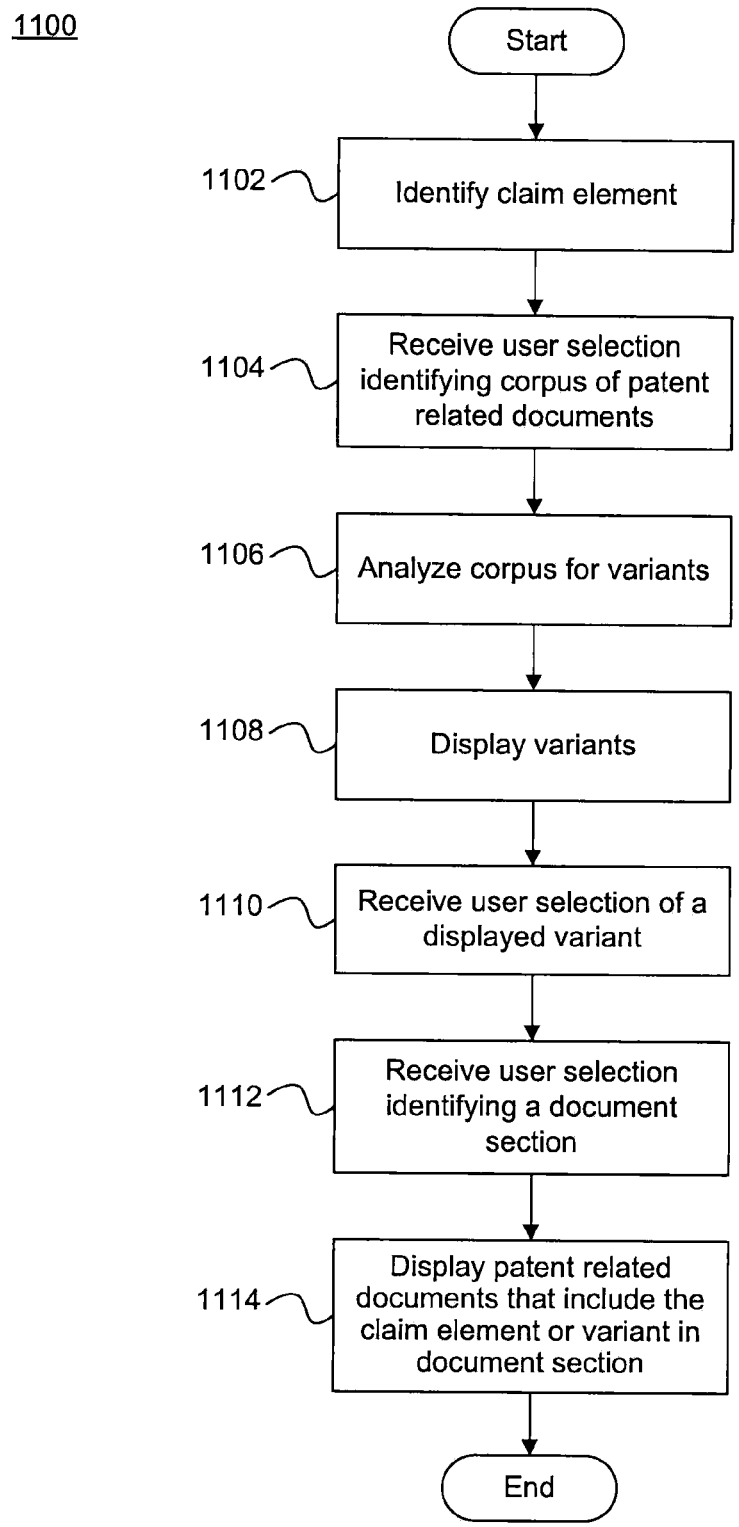
FIG. 11 illustrates flow diagram of a method for displaying patent-related documents that contain a claim element or variant.

FIG. 11 illustrates flow diagram 1100 for displaying patent-related documents that contain a claim element or variant. The steps in flow diagram 1100 may be performed by Variation Determining Component 210 (FIG. 2), which may execute on a processor, such as CPU 104 (FIG. 1).

At block 1102, Variation Determining Component 210 may identify a claim element. For example, as shown in FIG. 10, a user may select a claim element property value from graphical element 1002, such as "mold." At block 1104, Variation Determining Component 210 may receive a user selection identifying a corpus of patent-related documents from which to determine variants. For example, as described in FIG. 10, a user may select one of "Current Variants," "Class Variants," or "All Variants" from graphical element 1008. In particular, as shown in FIG. 10, a user may select "Current Variants" to set the corpus of patent-related documents to the body of patent-related documents initially determined by Results Component 202.

At block 1106, Variation Determining Component 210 may analyze the corpus of patent-related documents to determine variants of "mold." To do this, Variation Determining Component 210 may analyze the corpus of patent-related documents to determine word(s) that coexist with "mold," and which are used synonymously with "mold" in the corpus.

This analysis may be done in different ways. In exemplary embodiments, Variation Determining Component 210 may identify a part occurring in a patent-related document. As discussed, a part may be a component of a drawing reference, which include both the part and an identifier, such as a reference number. For example, a patent-related document may have a drawing reference "hollow tube 10." The same patent-related document may also have drawing references "cylindrical body 10" and "empty tube 10." Because the same identifier (i.e., "10") is being used to refer to a number of different parts (i.e., "hollow tube," "cylindrical body," and "empty tube"), Variation Determining Component 210 determines that these different parts may be used interchangeably. In other words, the different parts may be variants of each other.

Variation Determining Component 210 may also determine variants across different patent-related documents. For example, as discussed, Variation Determining Component 210 may identify "hollow tube," "cylindrical body," and "empty tube" as a first set of variants of each other because they all have the identifier "10" in the first patent-related document. Variation Determining Component 210 may also identify the following drawing references in a second patent-related document: "hollow body 24," U Shaped body 24, "hollow tube 24," and "empty tube 24." Variation Determining Component 210 may determine that the parts of these drawing references are a second set of variants of one another, because the drawing references all have the same identifier (i.e., 24).

Variation Determining Component 210 may also link the first set of variants with the second set of variants. For example, the first set of variants includes the drawing reference "hollow tube 10," while the second set of variants includes the drawing reference "hollow tube 24." These drawing references have the same part (i.e., "hollow tube") but different identifiers "(i.e., "10" and "24.") Different patent-related documents may use different identifiers when referring to the same part. Accordingly, Variation Determining Component 210 classifies "hollow tube 10," and "hollow tube 24" as referring to the same part. Variation Determining Component 210 may then further determine that the first set of variants are also variants with the second set of variants. In other words, the parts "hollow tube," "cylindrical body," "empty tube," "hollow body," U Shaped body," and "empty tube" are all variants of each other. Table 1 below summarizes this example:

TABLE 1

Determination of Variants

| First Patent-related Document | Second Patent-related Document |
|---|---|
| hollow tube 10 | hollow body 24 |
| cylindrical body 10 | U shaped body 24 |
| empty tube 10 | hollow tube 24 |
|  | empty tube 24 |

Table 1 illustrates the drawing references and parts from the first patent-related document and the second patent-related document. Table 1 also indicates that "hollow tube 10" and "hollow tube 24" (both shown in bold) link together the variants of the first patent-related document with the variants from the second patent-related document.

In this way, variants for parts in drawing elements may be determined. The extracted parts and their variants may be stored in a parts database, which may be stored, for example, in memory 106 in FIG. 1. Moreover, parts (e.g., "hollow tube") often also occur as terms, phrases, and/or claim elements. Accordingly, if, for example, "hollow tube" is also a claim element, then variants of the claim element are determined by accessing the parts database. The variants for the claim element "hollow tube" may then be determined to be "hollow tube," "cylindrical body," "empty tube," "hollow body," U Shaped body," and "empty tube."

At block 1108, Variation Determining Component 210 may cause the display of these determined variants. For example, as shown in FIG. 10, graphical element 1004 shows variants for the claim element "mold," such as "surface," "mold cavity," "mold cavities," etc., which may have been used in the corpus interchangeable with "mold."

At block 1110, Variation Determining Component 210 may receive a user selection of one or more of the displayed variants, for example, from graphical element 1004 in FIG. 10.

At block 1112, Variation Determining Component 210 may receive a user selection identifying a document section. For example, in graphical element 1010 in FIG. 10, a user may select from either "All Claims," "Claim Threads" or "Independent Claims." As shown in FIG. 10, the document section "All Claims" is selected. Accordingly, at block 1114, Variation Determining Component 210 may display patent-related documents that include the claim element or variant in the document section "All Claims." In other words, in this example, Variation Determining Component 210 displays a patent-related document if the selected claim element or variant occurs in any claim of the patent-related document. These patent-related documents may be displayed, for example, in citation list 1006 in FIG. 10.

Figure 12:
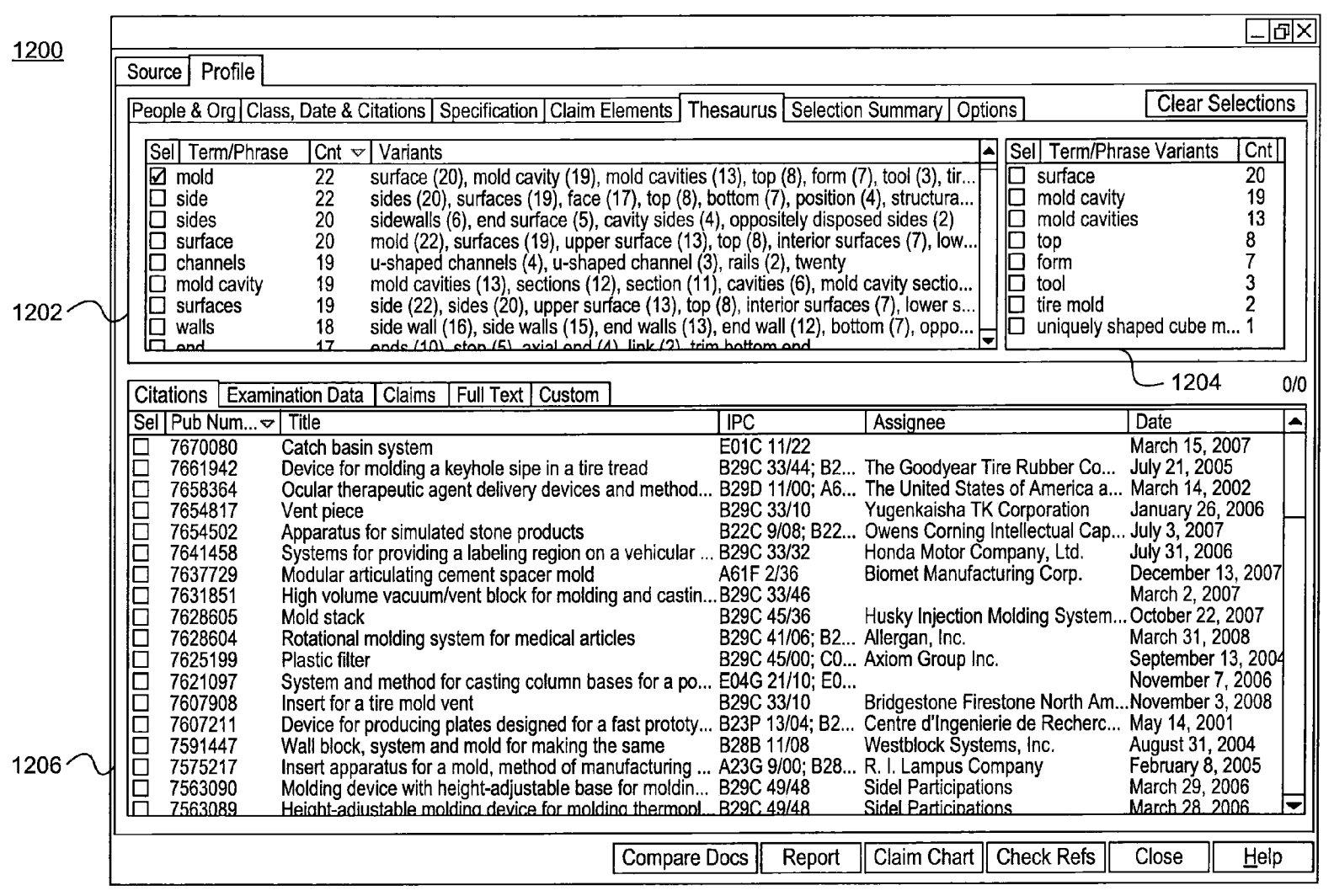

FIG. 12 illustrates a seventh graphical interface 1200 of a thesaurus that may be provided by Variant Determining Component 210. Graphical interface 1200 may include graphical element 1202, which may list subject matter property values (e.g., term, phrase, and/or claim element) and associated variants. For example, graphical element 1202 displays the subject matter property value "mold" and adjacently lists variants of "mold" (e.g., "surface," "mold cavity," "mold cavities").

The variants listed in graphical element 1202 have associated numbers in parentheses. These numbers may indicate the number of patent-related documents in which the variant and the selected term/phrase coexist. For example, the term/phrase "mold" and the variant "surface" may coexist (e.g., as determined in Table 1) in 20 patent related documents. In some embodiments, these numbers of coexisting patent-related documents may define a variant rank. In other embodiments, rank may be determined in a different way.

Using a rank, variants may be displayed in rank order for a particular term/phrase. For example, in graphical element 1202, the variants for "mold" are displayed in the order in which they are ranked by the numbers in parentheses. In disclosed embodiments, ranking may also be employed for claim element variants or any other type of variants.

Graphical interface 1200 also includes graphical element 1204, which lists the variants for user selection. For example, for the selected subject matter property value in graphical element 1202 (i.e., "mold"), graphical element 1204 lists its variants (e.g., "surface," "mold cavity," and "mold cavities") in selectable form. If a user selects subject matter property values from graphical element 1202 and variants from graphical element 1204, then Variant Determining Component 210 may display patent-related documents from the body in citation list 1206, which include either the selected subject matter property values or variants.

Figure 13:
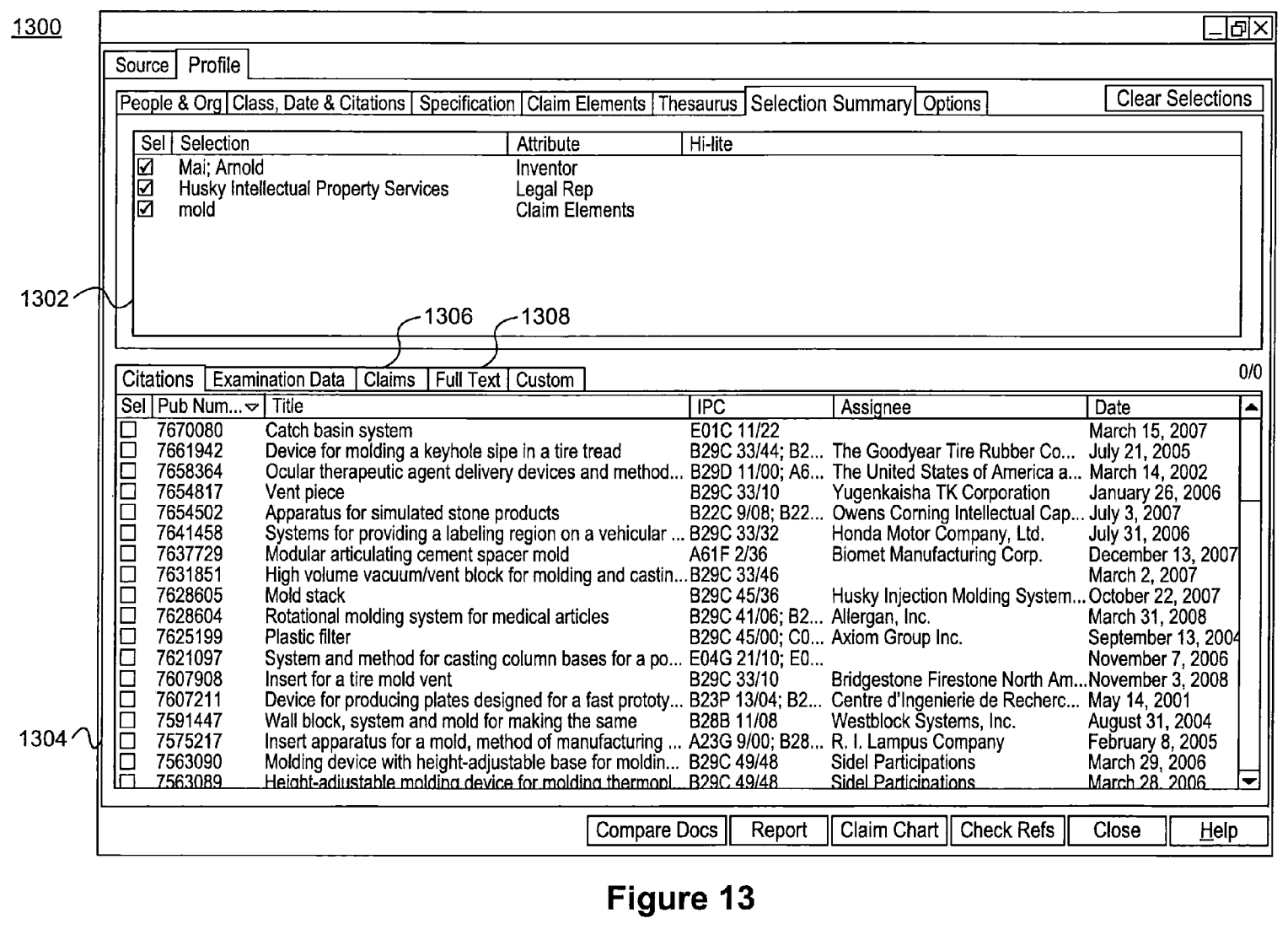

FIG. 13 illustrates an eighth graphical interface 1300 that may be provided by Summarizing Component 212. As discussed, Summarizing Component 212 may aggregate and display all of the previously selected bibliographic and subject matter property values and may permit de-selection of any previously selected property value.

For example, graphical interface 1300 includes property value summary 1302, which lists the property values selected by a user in previous graphical interfaces, such as graphical interfaces 500, 600, 700, 800, 1000, and 1200. In particular, property value summary 1302 may include the following selected property types: Inventor (from graphical element 504 in FIG. 5), Legal Representative (from graphical element 506 in FIG. 6), and Claim Elements (from graphical element 802). Graphical interface 1300 may also include citation list 1304, which may list patent-related documents filtered from the body of patent-related documents by the property values listed in property value summary 1302.

In disclosed embodiments, property value summary 1302 may permit a user to de-select any of the listed property values. In some embodiments, this de-selection may cause the patent-related documents listed in citation list 1304 to change accordingly. In other embodiments, the de-selection may not cause the patent-related documents listed in citation list 1304 to change. Moreover, Summarizing Component 212 may permit a user to select patent-related documents listed in citation list 1304.

Graphical interface 1300 may also include claims tab 1306 and full text tab 1308. Claims tab 1306 may permit a user to see claims of the patent-related documents selected in citation list 1304. And full text tab 1308 may permit a user to see full text for the patent-related documents selected in citation list 1304. Claims tab 1306 and full text tab 1308 may also be selectable in other graphical interfaces, such as graphical interfaces 600, 700, 800, 1000, and 1200.

Figure 14A:
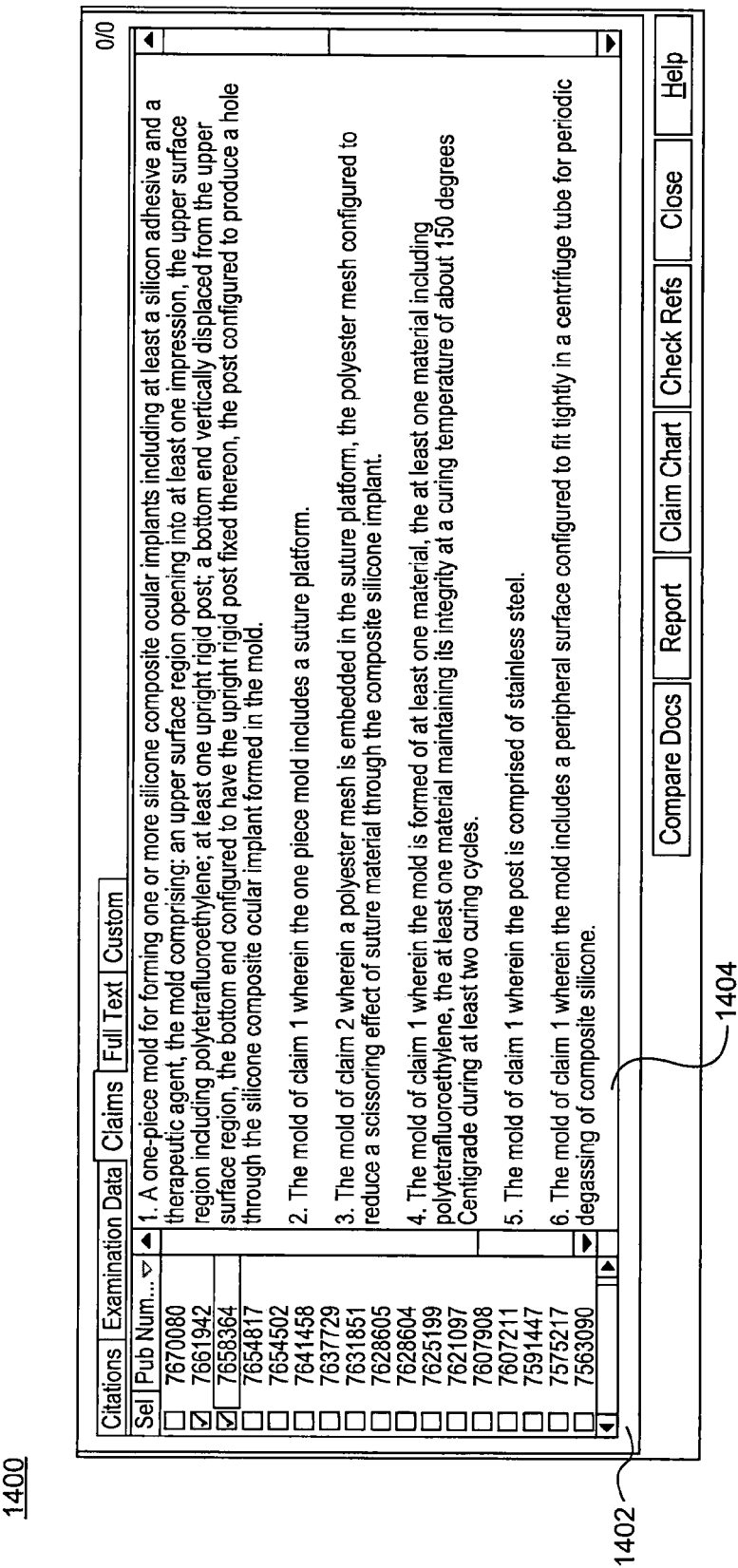
FIG. 14A illustrates a claim element graphical interface that displays claim elements for selected patent-related documents.

FIG. 14A illustrates claim element graphical interface 1400, which displays claim elements for selected patent-related documents. Graphical interface 1400 may be displayed after a user selects claims tab 1306 from FIG. 13, for example.

Graphical interface 1400 includes citation list 1402 and claims listing 1404. Citation list 1402 may list filtered patent-related documents, and claims listing 1404 may list the claims of the patent-related documents. In some embodiments, claims listing 1404 may only include independent claims, for example, according to an options setting.

Claim elements previously selected by a user may be highlighted in claims listing 1404. In particular, a claim element displayed in property value summary 1302 (FIG. 13) may be highlighted in claims listing 1404. Moreover, a selected variant of the selected claim element may also be highlighted in claims listing 1404 in the same color. One of ordinary skill will appreciate that any other visual representation or identifier may be used instead of color, such as highlighting, shading, hatching, etc.

As a user selects or de-selects property values from, for example, property value summary 1302 (FIG. 13), the highlighting in claim listing 1404 may dynamically change to reflect the section and de-selection. For example, if a user unselects the claim element "mold" from property value summary 1302, claim listing 1404 may remove highlighting from the word "mold" in the listed claims.

Figure 14B:
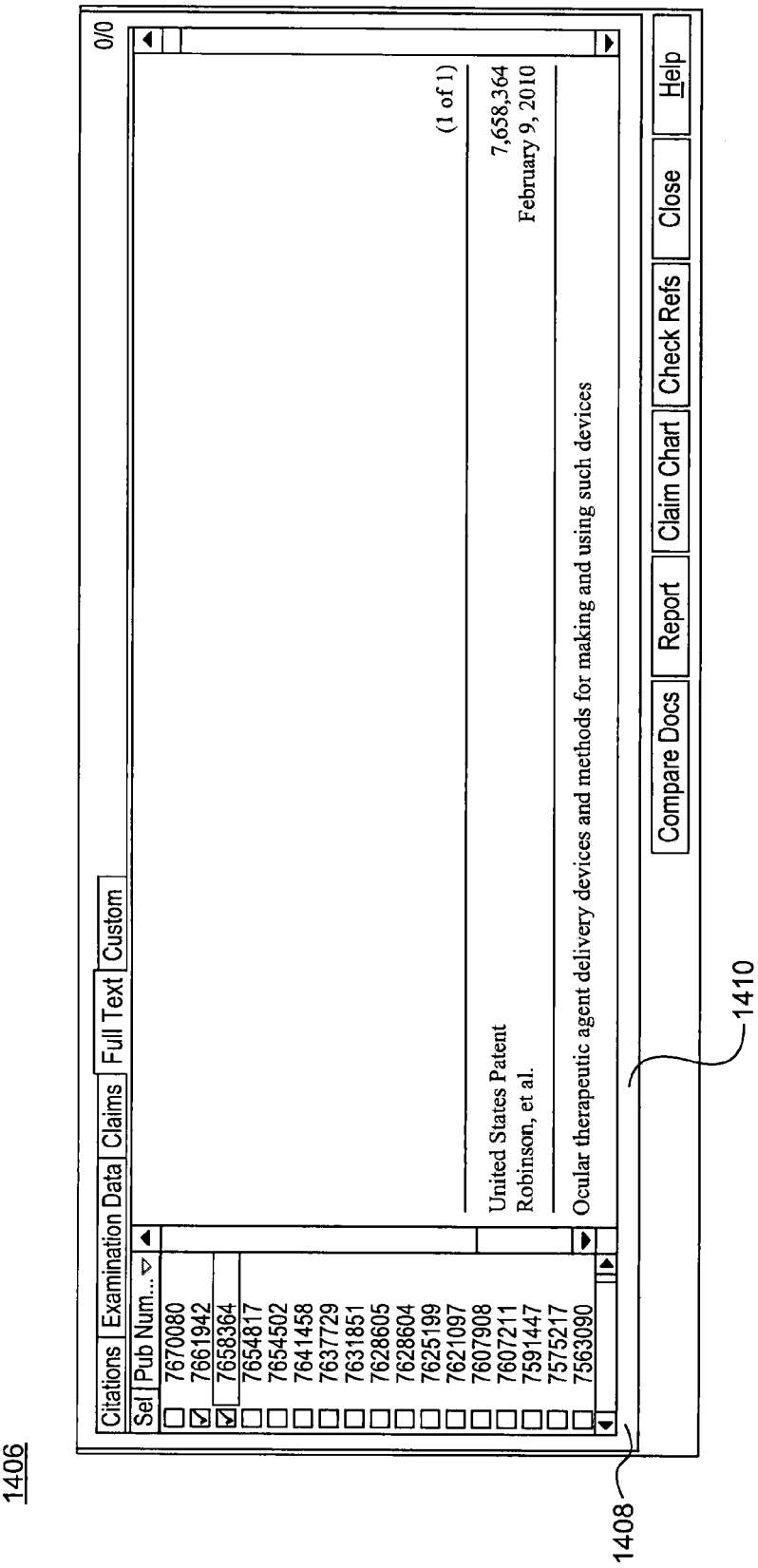
FIG. 14B illustrates a full text graphical interface that displays full text for selected patent-related documents.

FIG. 14B illustrates full text graphical interface 1406, which displays full text of selected patent-related documents. Graphical interface 1406 may be displayed, for example, after a user selects full text tab 1308 from FIG. 13.

Graphical interface 1406 includes citation list 1408 and full text 1410. Citation list 1408 may list filtered patent-related documents, and full text 1410 may display the full text of the patent-related documents.

Property values (either bibliographic or subject matter) previously selected by a user may be highlighted in full text 1410. For example, a part, claim element, or inventor displayed in, for example, property value summary 1302 (FIG. 13) may be highlighted in full text 1410. Moreover, a selected variant of the selected claim element or part may also be highlighted in claims listing 1410 in the same color. In some embodiments, a first selected claim element or part may be highlighted in a first color with its associated variants also highlighted in the first color. A second selected claim element or part may be highlighted in a second color with its associated variants also highlighted in the second color. One of ordinary skill will appreciate that any other visual representation or identifier may be used instead of color, such as highlighting, shading, hatching, etc.

As a user selects or de-selects property values from, for example, property value summary 1302 (FIG. 13), the highlighting in full text 1410 may dynamically change to reflect the section and de-selection. For example, if a user unselects the claim element "mold" from property value summary 1302, full text 1410 may remove highlighting from the word "mold" in the full text.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in hardware alone. Additionally, although disclosed aspects are described as being stored in a memory on a computer, one skilled in the art will appreciate that these aspects can also be stored on other types of computer-readable media, such as secondary storage devices, like hard disks, floppy disks, a CD-ROM, or other forms of RAM or ROM.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of providing patent-related documents having at least one property type to a user, the method comprising:
   displaying, in a first graphical element, identifiers of patent-related documents, wherein the patent-related documents comprise at least one of a patent and a patent application;
   analyzing, by at least one processor, the patent-related documents to determine at least one property value for the property type, the property value comprising a string of one or more words describing at least one technical aspect of the patent-related documents and occurring in a first subset of the patent-related documents;
   displaying a second graphical element associated with the property type, the second graphical element including the property value;
   receiving, at the second graphical element, a selected property value selected by the user;
   analyzing, by the at least one processor, a corpus of patent-related documents to determine at least one variant of the selected property value, the variant being a string of one or more words occurring in a second subset of the patent-related documents that is used interchangeably with respect to a meaning of the technical aspect of the selected property value within the corpus of patent-related documents such that the at least one variant is used to refer to the technical aspect described by the selected property value;
   rendering unselectable one or more property values that do not coexist in the corpus of patent-related documents with the selected property value by greying out the one or more property values that do not coexist in the corpus of patent-related documents and reordering one or more remaining property values that are selectable;
   displaying, in the first graphical element, identifiers of the first subset of the patent-related documents in which the selected property value and the at least one variant occurs;
   receiving a user selection identifying a document section of one or more patent-related documents of the first subset of the patent-related documents as one of:
      all claims in a claim set;
      a claim thread of interdependent claims, or
      independent claims; and
   displaying, in the first graphical element, those of the patent-related documents that include one or more selected claim elements, or variants of the selected claim elements, in the selected document section.

2. The method of claim 1, wherein the property value comprises at least one of: a part, a term, or a phrase.

3. The method of claim 1, wherein the property value comprises a claim element.

4. The method of claim 1, wherein the corpus of patent-related documents is one of:
   patents or patent applications stored in a database,
   the patent-related documents that were displayed in the first graphical element, or
   at least one class of patents or patent applications.

5. The method of claim 1, further comprising:
   displaying a full text patent-related document that includes both the selected property value and the variant, wherein the patent-related document comprises a patent or a patent application; and
   highlighting the selected property value and the variant with a common identifier in the full text patent-related document.

6. The method of claim 1, wherein the second graphical element includes a plurality of selected property values, the method further comprising:
   ranking the selected property values in accordance with a number of the patent-related documents in which the selected property values occur; and
   ordering the selected property values in the second graphical element according to the ranking.

7. The method of claim 1, wherein displaying identifiers of the first subset of the patent-related documents associated with the selected property value further comprises:
   displaying related metadata with the identifiers, the metadata comprising an identification of independent claims and dependent claims in the first subset of the patent-related documents in which the selected property value occurs.

8. A non-transitory computer-readable medium comprising program instructions which, when executed by at least one processor, cause the processor to perform a method of providing patent-related documents having at least one property type to a user, the method comprising:
   displaying, in a first graphical element, identifiers of patent-related documents, wherein the patent-related documents comprise at least one of a patent and a patent application;
   analyzing the patent-related documents to determine at least one property value for the property type, the property value comprising a string of one or more words describing at least one technical aspect of the patent-related documents and occurring in a first subset of the patent-related documents;
   displaying a second graphical element associated with the property type, the second graphical element including the property value;
   receiving, at the second graphical element, a selected property value selected by the user;
   analyzing, by the at least one processor, a corpus of patent-related documents to determine at least one variant of the selected property value, the variant being a string of one or more words occurring in a second subset of the patent-related documents that is used interchangeably with respect to a meaning of the technical aspect of the selected property value within the corpus of patent-related documents such that the at least one variant is used to refer to the technical aspect described by the selected property value;
   rendering unselectable one or more property values that do not coexist in the corpus of patent-related documents with the selected property value by greying out the one or more property values that do not coexist in the corpus of patent-related documents and reordering one or more remaining property values that are selectable;

displaying, in the first graphical element, identifiers of the first subset of the patent-related documents in which the selected property value and the at least one variant occurs;

receiving a user selection identifying a document section of one or more patent-related documents of the first subset of the patent-related documents as one of:
- all claims in a claim set;
- a claim thread of interdependent claims, or independent claims; and displaying, in the first graphical element, those of the patent-related documents that include one or more selected claim elements, or variants of the selected claim elements, in the selected document section.

9. The computer-readable medium of claim 8, wherein the corpus of patent-related documents is one of:
- patents or patent applications stored in a database,
- the patent-related documents that were displayed in the first graphical element, or
- at least one class of patents or patent applications.

10. The computer-readable medium of claim 8, the method further comprising:
- displaying a full text patent-related document that includes both the selected property value and the variant, wherein the patent-related document comprises a patent or a patent application; and
- highlighting the selected property value and the variant with a common identifier in the full text patent-related document.

11. The computer-readable medium of claim 8, wherein the second graphical element includes a plurality of selected property values, the method further comprising:
- ranking the selected property values in accordance with a number of the patent-related documents in which the selected property values occur; and
- ordering the selected property values in the second graphical element according to the ranking.

12. A method of providing patent-related documents having at least one property type to a user, the method comprising:
- retrieving, from a storage, patent-related documents, wherein the patent-related documents comprise at least one of a patent and a patent application;
- analyzing, by at least one processor, the patent-related documents to determine at least one property value for the property type, the property value comprising a string of one or more words describing at least one technical aspect of the patent-related documents and occurring in a first subset of the patent-related documents;
- analyzing a corpus of patent-related documents to determine at least one variant of the property type, the variant being a string of one or more words occurring in a second subset of the patent-related documents that is used interchangeably with respect to a meaning of the technical aspect of the property value within the corpus of patent-related documents such that the at least one variant is used to refer to the technical aspect described by the property value, wherein analyzing the corpus of patent-related documents to determine at least one variant of the property value comprises:
  - identifying a first drawing element in an identified patent-related document, the first drawing element including a part and a first reference, wherein the patent-related document comprises a patent or a patent application;
  - identifying a second drawing element in the identified patent-related document, the second drawing element including a different part and a second reference; and
  - associating the part with the different part as variants when the first reference and the second reference are the same;
- displaying, in a first graphical element identifiers of the patent-related documents;
- displaying a second graphical element associated with the property type, the second graphical element including the property value;
- receiving, at the second graphical element, a selected property value selected by the user;
- in response to the user selection:
  - rendering unselectable one or more property values that do not coexist in the corpus of patent-related documents with the selected property value by greying out the one or more property values that do not coexist in the corpus of patent-related documents,
  - reordering one or more remaining property values that are selectable, and
  - displaying a third graphical element with the variant;
- receiving a user selection of the variant; and
- displaying, in the first graphical element, identifiers of the first subset in which the property value occurs and identifiers of the second subset in which the variant occurs.

* * * * *